(12) United States Patent
Kubota

(10) Patent No.: US 8,817,187 B2
(45) Date of Patent: *Aug. 26, 2014

(54) DIGITAL BROADCAST RECEIVER APPARATUS AND IMAGE DISPLAY METHOD

(75) Inventor: Koumei Kubota, Osaka (JP)

(73) Assignee: Panasonic Corporation, Osaka (JP)

( * ) Notice: Subject to any disclaimer, the term of this patent is extended or adjusted under 35 U.S.C. 154(b) by 111 days.

This patent is subject to a terminal disclaimer.

(21) Appl. No.: 13/254,194

(22) PCT Filed: Jan. 28, 2010

(86) PCT No.: PCT/JP2010/000488
§ 371 (c)(1),
(2), (4) Date: Sep. 1, 2011

(87) PCT Pub. No.: WO2010/103717
PCT Pub. Date: Sep. 16, 2010

(65) Prior Publication Data
US 2011/0304770 A1 Dec. 15, 2011

(30) Foreign Application Priority Data
Mar. 11, 2009 (JP) ................................ 2009-058276

(51) Int. Cl.
*H04N 5/445* (2011.01)
*G06T 3/00* (2006.01)
*H04N 21/431* (2011.01)
*H04N 5/45* (2011.01)
*H04N 21/426* (2011.01)
*H04N 21/4402* (2011.01)
*H04N 5/44* (2011.01)

(52) U.S. Cl.
CPC .. *H04N 5/45* (2013.01); *G06T 3/00* (2013.01); *H04N 5/44591* (2013.01); *H04N 5/4401* (2013.01); *H04N 21/431* (2013.01); *H04N 21/42653* (2013.01); *H04N 21/440263* (2013.01); *H04N 21/4316* (2013.01)
USPC ........... 348/563; 348/564; 348/565; 348/569; 348/570; 348/731

(58) Field of Classification Search
USPC ......... 348/565, 563–564, 569, 731–732, 570; 725/73, 38, 40, 134, 140–142, 725/152–153
IPC .................................................. H04N 5/50,5/45
See application file for complete search history.

(56) References Cited

U.S. PATENT DOCUMENTS

| 5,973,681 | A | 10/1999 | Tanigawa et al. | |
|---|---|---|---|---|
| 6,268,849 | B1 * | 7/2001 | Boyer et al. | ..................... 725/40 |

(Continued)

FOREIGN PATENT DOCUMENTS

| CN | 1175850 | 3/1998 |
|---|---|---|
| CN | 101287083 | 10/2008 |

(Continued)

OTHER PUBLICATIONS

U.S. Appl. No. 13/254,193 to Koumei Kubota, filed Sep. 1, 2011.

(Continued)

*Primary Examiner* — Jefferey Harold
*Assistant Examiner* — Omer Khalid
(74) *Attorney, Agent, or Firm* — Greenblum & Bernstein, P.L.C.

(57) ABSTRACT

In a launcher display state, a launcher image is displayed on a screen. The launcher image includes a display frame. An application image, which has been reduced based on application video data at the time of startup previously stored in a main memory, is displayed in the display frame. In an intermediate display state, an intermediate launcher image is displayed on the screen. The intermediate launcher image includes an intermediate frame. In the intermediate frame, an application image, which has been reduced based on the application video data at the time of startup previously stored in the main memory, is displayed in the intermediate frame. In an application display state, an application image during startup is displayed on the whole screen of a monitor.

10 Claims, 18 Drawing Sheets

(56) References Cited

U.S. PATENT DOCUMENTS

| | | | |
|---|---|---|---|
| 7,287,266 B2* | 10/2007 | Aratani et al. | 725/37 |
| 7,305,698 B1 | 12/2007 | Tanigawa et al. | |
| 7,950,043 B2 | 5/2011 | Aoki et al. | |
| 8,159,614 B2* | 4/2012 | Hwang et al. | 348/564 |
| 2002/0063797 A1 | 5/2002 | Aratani et al. | |
| 2005/0162557 A1* | 7/2005 | Choi | 348/565 |
| 2006/0225122 A1 | 10/2006 | Aratani et al. | |
| 2007/0076130 A1 | 4/2007 | Fukushima | |
| 2007/0300282 A1 | 12/2007 | Aratani et al. | |

FOREIGN PATENT DOCUMENTS

| | | |
|---|---|---|
| JP | 07-064530 | 3/1995 |
| JP | 11-146299 | 5/1999 |
| JP | 2001-183977 | 7/2001 |
| JP | 2001-188672 | 7/2001 |
| JP | 2002-135676 | 5/2002 |
| JP | 2003-030687 | 1/2003 |
| JP | 2005-101680 | 4/2005 |
| JP | 2006-94361 | 4/2006 |
| JP | 2007-104083 | 4/2007 |
| JP | 2008-193731 | 8/2008 |

OTHER PUBLICATIONS

U.S. Appl. No. 13/214,649 to Yasuhiro Ishii et al., filed Aug. 22, 2011.

China Office action, dated Jul. 9, 2013 along with an english translation thereof (search report).

* cited by examiner

FIG. 4
(a)
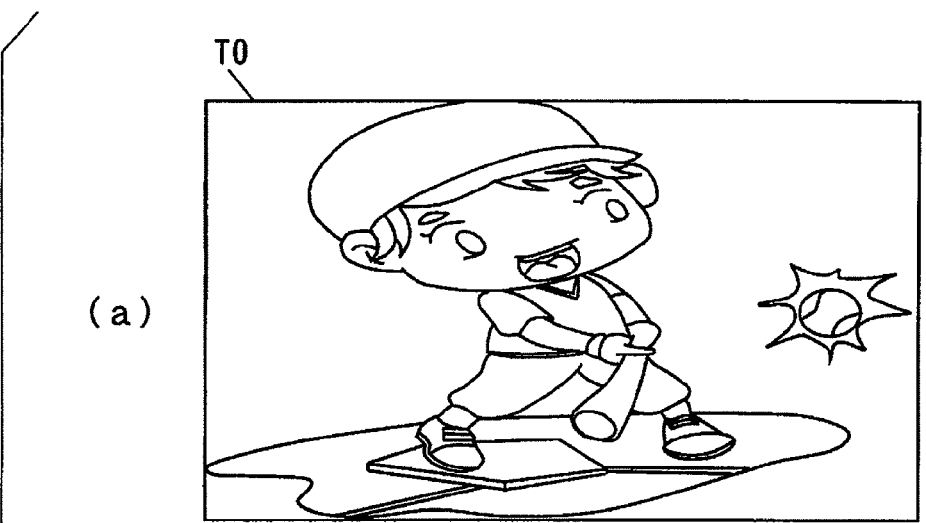
(b)
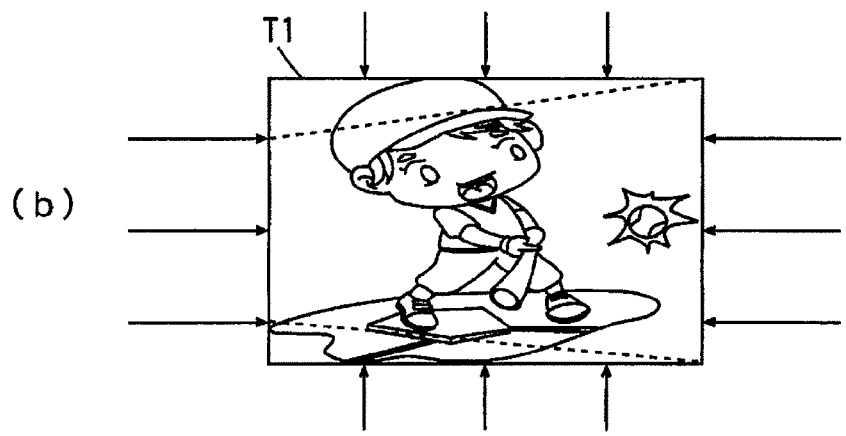
(c)
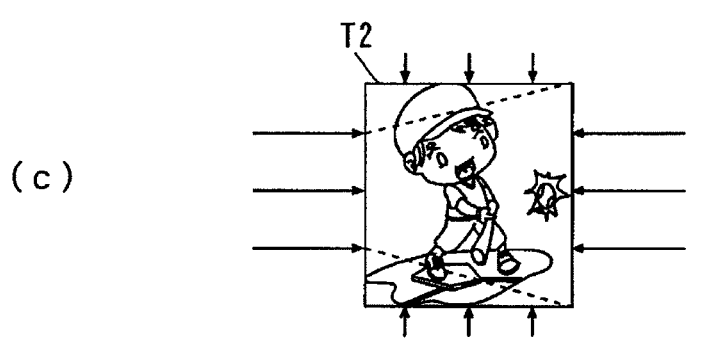

F I G. 5
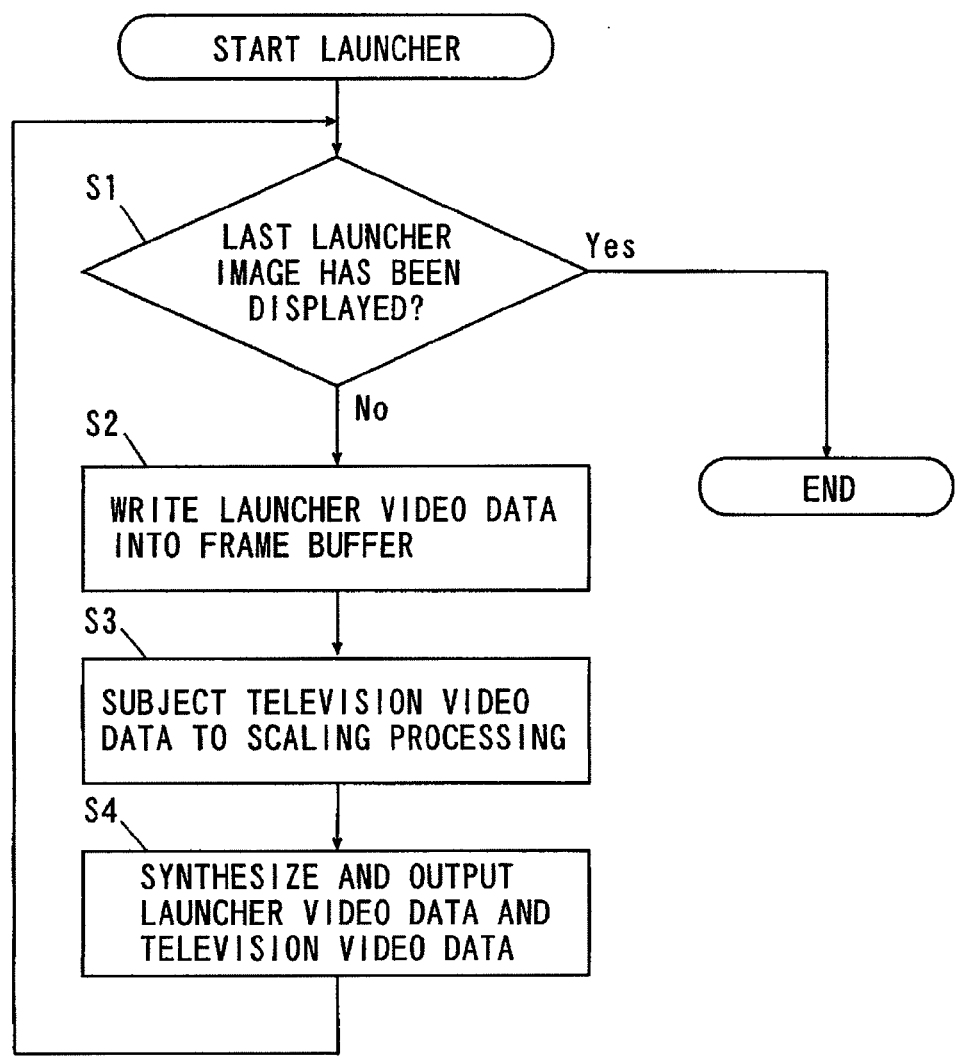

FIG. 16
(a) 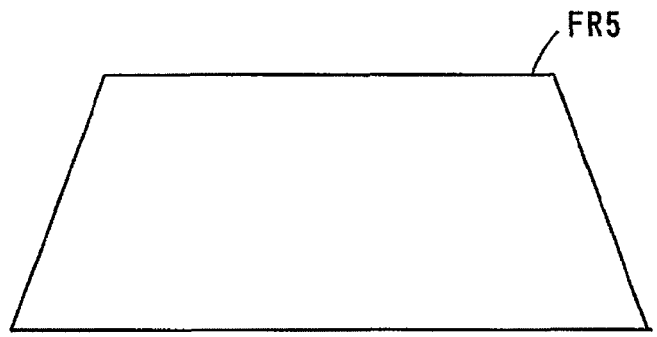
(b) 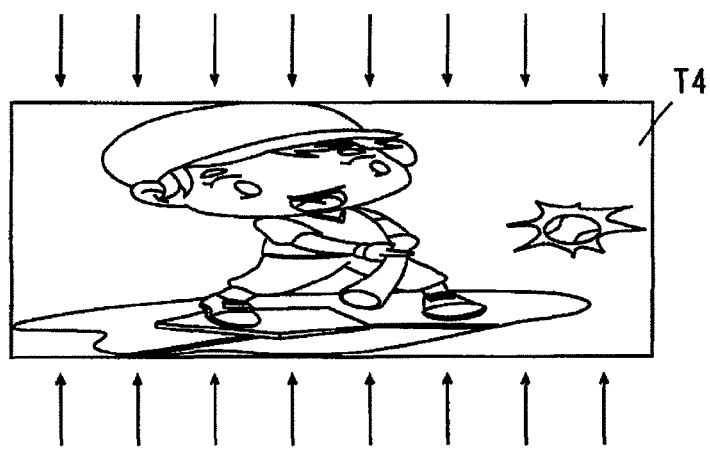
(c) 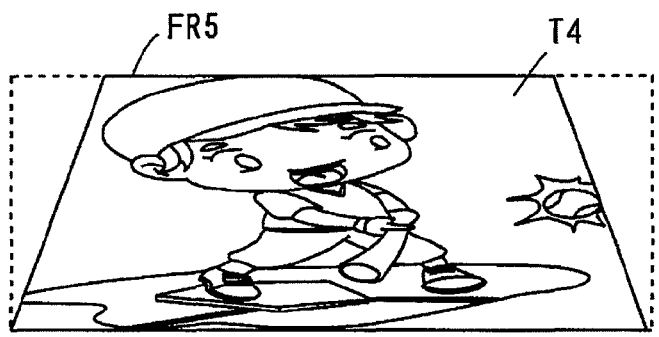

F I G. 1 7
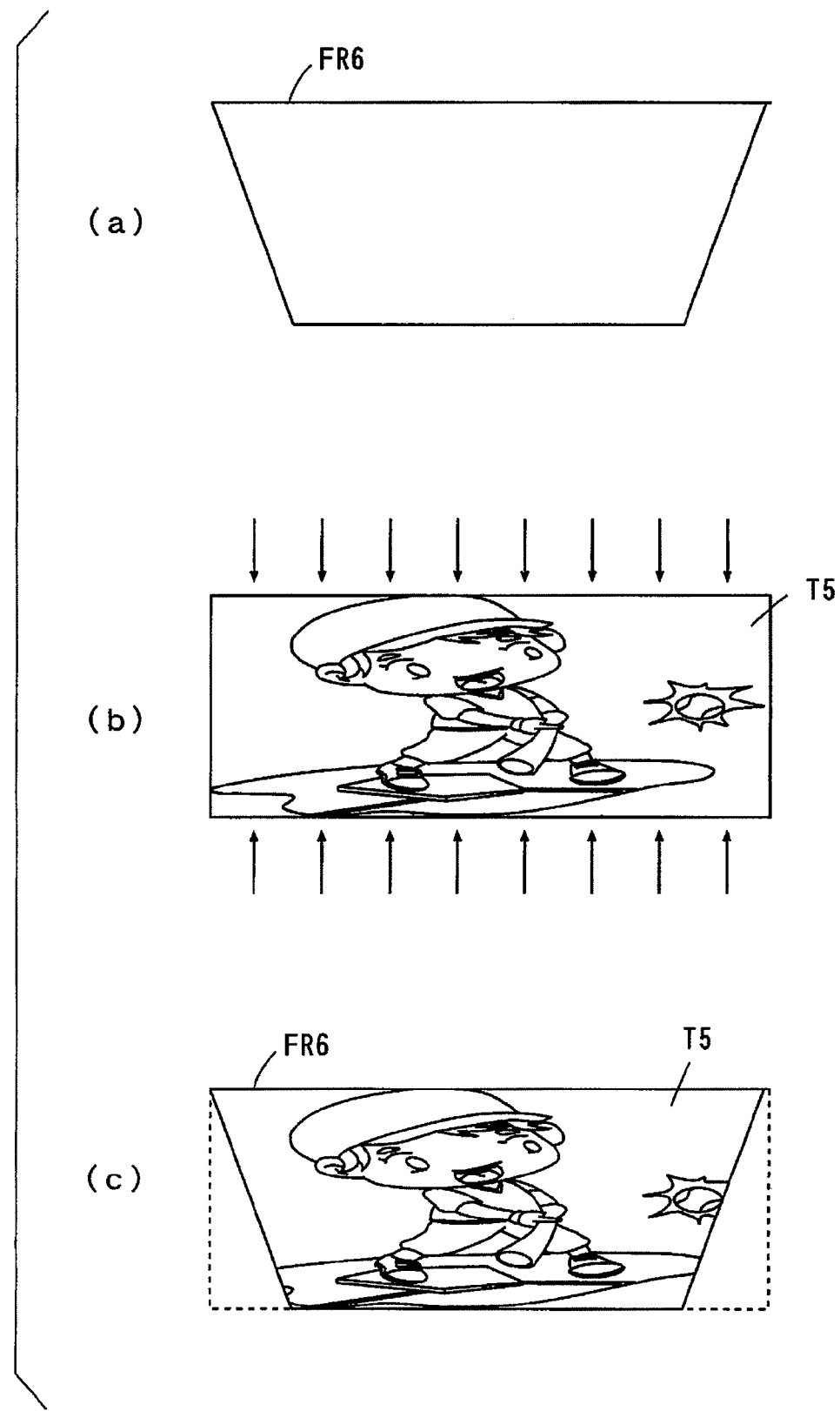

DIGITAL BROADCAST RECEIVER APPARATUS AND IMAGE DISPLAY METHOD

TECHNICAL FIELD

The present invention relates to a digital broadcast receiving apparatus that receives digital broadcasting to display an image on a screen of a display device, and a video display method for displaying the image on the screen of the display device.

BACKGROUND ART

In a personal computer, a launcher image is displayed to select any one of a plurality of application programs on a screen of a monitor.

In the launcher image, a plurality of start buttons corresponding to the plurality of application programs is displayed. A user can start the desired application program by selecting any one of the plurality of start buttons (see Patent Document 1).

Generally, in a digital broadcasting receiving apparatus, a remote controller switches between a state where an image for digital broadcasting (hereinafter referred to as a television image) is displayed on a screen of a monitor and a state where a launcher image for a user to perform various operations is displayed on the screen. Alternatively, the remote controller switches between a state where the launcher image is displayed on the screen of the monitor and a state where the application program is displayed on the screen.

When the user gives an instruction for switching to the launcher image by operating the remote controller with the television image displayed on the screen, for example, the launcher image appears after the television image disappears. When the user starts the application program with the launcher image displayed on the screen, the image for the application program is displayed after the launcher image on the screen disappears.

[Patent Document 1] JP 2001-188672 A

DISCLOSURE OF THE INVENTION

Problems to be Solved by the Invention

As described above, in the conventional digital broadcast receiving apparatus, an image is instantaneously interrupted at the time of switching between a television image and a launcher image. Similarly, an image is instantaneously interrupted at the time of switching between the launcher image and an application image. Thus, a user may have an uncomfortable feeling.

An object of the present invention is to provide a digital broadcast receiving apparatus and a video display method capable of ensuring continuity of an image at the time of switching of the image.

Means for Solving the Problems (1) In accordance with an aspect of the present invention, a digital broadcast receiving apparatus is a digital broadcast receiving apparatus that receives digital broadcasting to display an image on a screen of a display device, including a first image generator that generates first video data for displaying an image for an application program as a first image on the screen, a second image generator that generates second video data for displaying a graphic image as a second image on the screen, a storage that stores the first video data generated by the first image generator at predetermined timing, a synthesizer that synthesizes the first video data and the second video data to display the first and second images on the screen, and a controller that selectively switches a display state on the screen between a first display state where the first image is displayed and a second display state where the first and second images are displayed, in which the second image in the second display state includes a display frame for displaying the first image, and the controller controls the first image generator so that the first image based on the first video data generated by the first image generator is displayed on the screen in the first display state, and controls the second image generator, the storage, and the synthesizer so that the second image based on the second video data generated by the second image generator is displayed on the screen while the first image based on the first video data stored in the storage is displayed in the display frame in the second display state.

In the digital broadcast receiving apparatus, the first image generator generates the first video data for displaying the image for the application program as the first image on the screen. The second image generator generates the second video data for displaying the graphic image as the second image on the screen. The storage stores the first video data generated by the first image generator at predetermined timing. The controller selectively switches the display state on the screen between the first display state and the second display state.

In the first display state, the first image is displayed on the screen. In the second display state, the first and second images are displayed on the screen. The second image in the second display state includes the display frame for displaying the first image. In this case, the first image based on the first video data stored in the storage is displayed in the display frame.

Even if the first image generator does not thus generate the first image in the second display state, the first image is continuously displayed in the first display state and the second display state. Therefore, continuity of the image can be ensured at the time of switching of the image. As a result, an uncomfortable feeling due to an interruption of the image can be prevented from being given to the user.

(2) The storage may store the first video data corresponding to the image at the time of startup of the application program, and the controller may cause the display state on the screen to change from the second display state to the first display state when an instruction to start the application program is issued, control the second image generator, the storage, and the synthesizer so that the image at the time of startup of the application program is displayed in the display frame based on the first video data stored in the storage in the second display state, and control the first image generator so that the image for the application program during startup is displayed on the screen based on the first video data generated by the first image generator in the first display state.

In this case, if the instruction to start the application program is issued, the display frame is displayed on the screen while the image at the time of startup of the application program is displayed in the display frame based on the first video data stored in the storage in the second display state. Then, the image for the application program during startup is displayed on the screen based on the first video data generated by the first image generator in the first display state.

Even if the application program is not thus started up in the second display state, the image at the time of startup of the application program and the image for the application program during startup are continuously displayed in the second display state and the first display state when an instruction to start the application program is issued. Therefore, at the time of startup of the application program, an uncomfortable feeling due to an interruption of the image can be prevented from being given to the user.

(3) The storage may store the first video data corresponding to the image for the application program at the end of the first display state, and the controller may cause the display state on the screen to change from the first display state to the second display state when an instruction to switch from the first display state to the second display state is issued, control the first image generator so that the image for the application program during startup is displayed on the screen based on the first video data generated by the first image generator in the first display state, and control the second image generator, the storage, and the synthesizer so that the image for the application program at the end of the first display state is displayed in the display frame based on the first video data stored in the storage in the second display state.

In this case, if the instruction to switch from the first display state to the second display state is issued, the image for the application program during startup is displayed on the screen based on the first video data generated by the first image generator in the first display state. Then, the image for the application program at the end of the first display state is displayed in the display frame based on the first video data stored in the storage in the second display state.

When the instruction to switch from the first display state to the second state is thus issued, the image for the application program during startup in the first display state and the second display state and the image for the application program at the end of the first display state are continuously displayed in the first display state and the second display state. Thus, an uncomfortable feeling due to an interruption of the image can be prevented from being given to the user at the time of switching from the first display state to the second display state.

(4) The storage may store the first video data corresponding to the image at the time of startup and at the end of the application program, and the controller may cause the display state on the screen to change from the first display state to the second display state when an instruction to end the application program is issued, control the first image generator so that the image for the application program during startup is displayed on the screen based on the first video data generated by the first image generator in the first display state, and control the second image generator, the storage, and the synthesizer so that the image at the time of startup of the application program is displayed in the display frame based on the first video data stored in the storage after the image at the end of the application program is displayed in the display frame based on the first video data stored in the storage in the second display state.

In this case, if the instruction to end the application program is issued, the image for the application program during startup is displayed on the screen based on the first video data generated by the first image generator in the first display state. Then, the image at the time of startup of the application program is displayed in the display frame based on the first video data stored in the storage after the image at the end of the application program is displayed in the display frame based on the first video data stored in the storage in the second display state.

Even if the application program is thus ended in the second display state, the image for the application program during startup, the image at the end of the application program, and the image at the time of startup of the application program are continuously displayed in the first display state and the second display state when the instruction to end the application program is issued. Thus, at the end of the application program, an uncomfortable feeling due to an interruption of the image can be prevented from being given to the user.

The image at the time of startup of the application program is displayed in the display frame after the end of the application program. When the instruction to start the application program is then issued, therefore, the image at the time of startup of the application program and the image for the application program during startup are continuously displayed. Thus, continuity of the image can be ensured in a period from the end of the application program to the subsequent startup of the application program.

(5) The controller may switch the display state on the screen between the first display state and the second display state via an intermediate display state where the first and second images are displayed, the second image in the intermediate display state may include an intermediate frame having a size larger than that of the display frame, and the controller may control the second image generator, the storage, and the synthesizer so that the second image based on the second video data generated by the second image generator is displayed on the screen while the first image based on the first video data stored in the storage is displayed in the intermediate frame in the intermediate display state.

In this case, the display state on the screen is switched from the first display state to the second display state via the intermediate display state, or the display state on the screen is switched from the second display state to the first display state via the intermediate display state.

The second image in the intermediate display state includes the intermediate frame having a larger size than that of the display frame. In the intermediate display state, the second image based on the second video data generated by the second image generator is displayed on the screen while the first image based on the first video data stored in the storage is displayed in the intermediate frame. Thus, at the time of switching between the first display state and the second display state, the size of the first image is changed in a step-by-step manner. Therefore, continuity of the image at the time of switching between the first display state and the second display state can be ensured while a visual effect can be enhanced.

(6) The second image in the second display state may further include an operation portion that can be operated by the user.

In this case, in the second display state, the first image is displayed in the display frame while the operation portion is displayed on the screen. Therefore, the user can operate the operation portion while seeing the first image.

(7) The operation portion may include a startup instructor for issuing an instruction to start the application program.

In this case, in the second display state, the user can give the instruction to start the application program by operating the startup operation portion. Thus, the image for the application program can be easily displayed as the first image in the display frame.

(8) The digital broadcast receiving apparatus may further include a size changer that processes the first video data generated by the first image generator to change at least one of the vertical and horizontal sizes of the first image, in which the display frame may have a shape different from that of the screen, and the controller may control the second image generator so that the second image is displayed on the screen in the second display state, control the size changer so that the vertical and horizontal sizes of the first image are respectively changed to the maximum lengths in a vertical direction and a horizontal direction of the display frame, and control the synthesizer so that a portion corresponding to an area, in the display frame, of the first image changed by the size changer is displayed in the display frame.

The display frame included in the second image has a shape different from that of the screen. The size changer processes the first video data generated by the first image generator to change at least one of the vertical and horizontal sizes of the first image. In this case, the vertical and horizontal sizes of the first image are respectively changed to the maximum lengths in the vertical direction and the horizontal direction of the display frame included in the second image. The synthesizer synthesizes the first video data processed by the size changer and the second video data generated by the second image generator. Thus, a portion corresponding to the area, in the display frame, of the changed first image is displayed in the display frame.

Thus, the vertical and horizontal sizes of the first image are made smaller than those of the screen while the reduced first image is displayed in the display frame having the shape different from that of the screen. Therefore, a stereoscopic effect of the first image can be obtained without performing complicated three-dimensional display. Thus, a visual effect of the image can be enhanced at low cost.

Processing for reducing the vertical and horizontal sizes of the first image can be performed in a short time. Even if the first image is a moving image, therefore, the reduced moving image can be displayed in the display frame by processing for a short time. As a result, an uncomfortable feeling due to an interruption of the image can be prevented from being given to the user.

(9) The shape different from that of the screen may be a perspective shape of the screen. In this case, a stereoscopic effect of the first image can be sufficiently obtained.

(10) The digital broadcast receiving apparatus may further include a receiver that receives digital broadcasting, in which the first image generator may further generate third video data for displaying the image for the digital broadcasting received by the receiver as a third image on the screen, the synthesizer may synthesize the third video data and the second video data to display the third and second images on the screen, and the controller may control the second image generator so that the second image is displayed on the screen, control the size changer so that the vertical and horizontal sizes of the third image are respectively changed to the maximum lengths in the vertical direction and the horizontal direction of the display frame, and control the synthesizer so that a portion corresponding to an area, in the display frame, of the third image changed by the size changer is displayed in the display frame.

In this case, the vertical and horizontal sizes of the third image can be respectively changed to the maximum lengths in the vertical direction and the horizontal direction of the display frame included in the second image. The synthesizer synthesizes the third video data processed by the size changer and the second video data generated by the second image generator. Thus, a portion corresponding to an area, in the display frame, of the changed third image is displayed in the display frame.

Thus, the vertical and horizontal sizes of the third image are made smaller than those of the screen while the reduced third image is displayed in the display frame having a shape different from that of the screen. Therefore, a stereoscopic effect of the third image can be obtained without performing complicated three-dimensional display. Thus, a visual effect of the image can be enhanced at low cost.

Processing for reducing the vertical and horizontal sizes of the third image can be performed in a short time. Even when the third image is a moving image, therefore, the reduced moving image can be displayed in the display frame by processing for a short time. As a result, an uncomfortable feeling due to an interruption of the image can be prevented from being given to the user.

(11) In accordance with another aspect of the present invention, a video display method is a video display method for displaying an image on a screen of a display device by a digital broadcast receiving apparatus, including the steps of generating first video data for displaying an image for an application program as a first image on the screen, generating second video data for displaying a graphic image including a display frame for displaying a first image as a second image on the screen, storing the first video data generated at predetermined timing in a storage, synthesizing the first video data and the second video data to display the first and second images on the screen, selectively switching a display state on the screen between a first display state where the first image is displayed and a second display state where the first and second images are displayed, controlling the generation of the first video data so that the first image based on the generated first video data is displayed on the screen in the first display state, and controlling the generation of the second video data, the storage of the first video data, and the synthesis of the first and second video data so that the second image based on the generated second video data is displayed on the screen while the first image based on the first video data stored in the storage is displayed in the display frame in the second display state.

In the video display method, the first video data for displaying the image for the application program as the first image on the screen is generated. The second video data for displaying the graphic image as the second image on the screen is generated. The storage stores the first video data generated at predetermined timing. The display state on the screen is selectively switched between the first display state and the second display state.

In the first display state, the first image is displayed on the screen. In the second display state, the first and second images are displayed on the screen. The second image in the second display state includes the display frame for displaying the first image. In this case, the first image based on the first video data stored in the storage is displayed in the display frame.

Even when the first image is not generated in the second display state, the first image is continuously displayed in the first display state and the second display state. Therefore, continuity of the image can be ensured at the time of switching of the image. As a result, an uncomfortable feeling due to an interruption of the image can be prevented from being given to the user.

Effects of the Invention

According to the present invention, even when a first image generator does not generate a first image in a second display state, the first image is continuously displayed in a first display state and a second display state. Thus, continuity of the image can be ensured at the time of switching of the image. As a result, an uncomfortable feeling due to an interruption of the image can be prevented from being given to a user.

BRIEF DESCRIPTION OF THE DRAWINGS

FIG. 4 is a schematic view illustrating transition of a television image at the time of switching from a television display state to a launcher display state.

FIG. 5 is a flowchart illustrating an operation of a controller at the time of switching from a television display state to a launcher display state at the time of startup of a launcher.

FIG. 16 is a schematic view illustrating another example of a display frame in a launcher image.

FIG. 17 is a schematic view illustrating another example of a display frame in a launcher image.

BEST MODE FOR CARRYING OUT THE INVENTION

Figure 1:
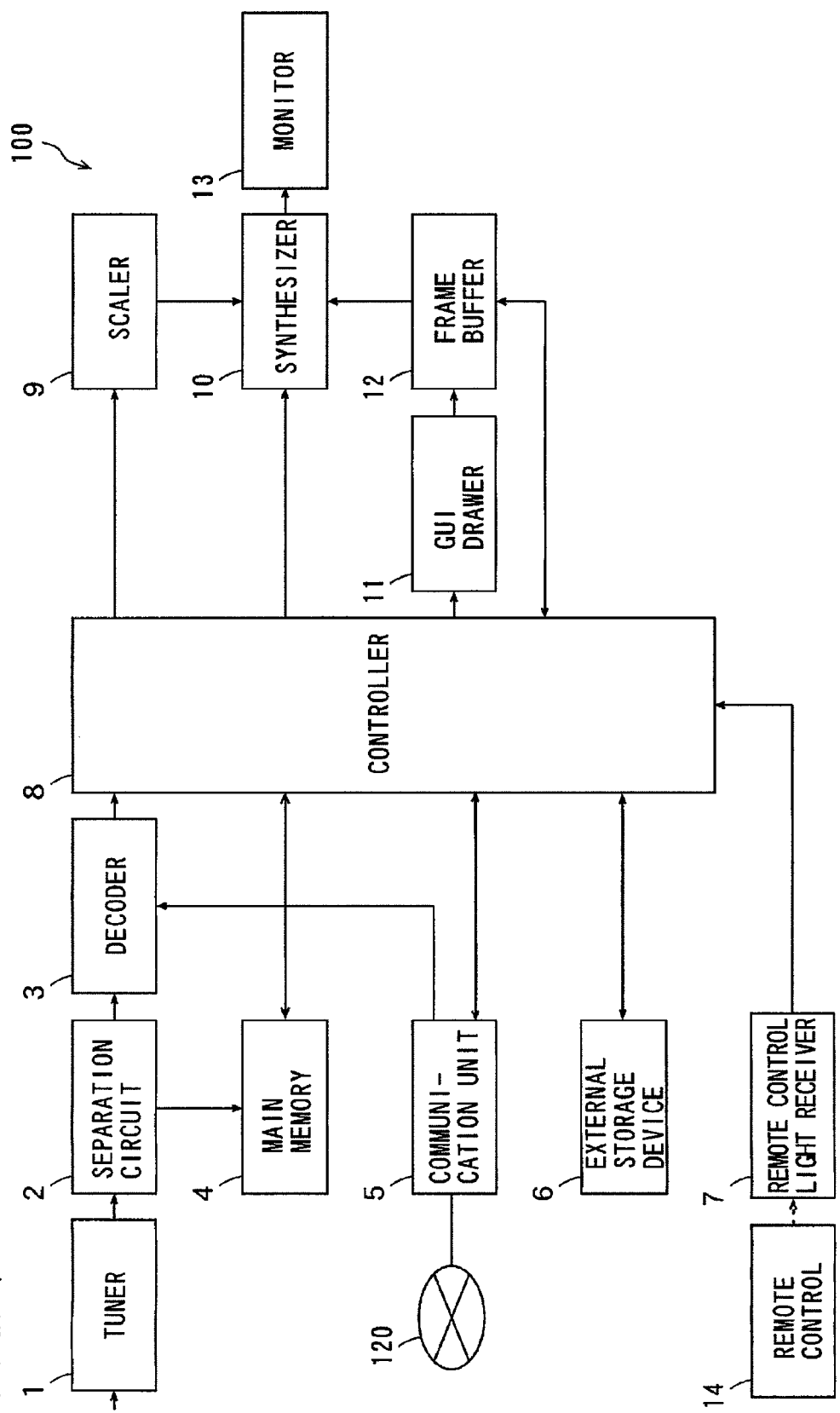
FIG. 1 is a block diagram illustrating a configuration of a digital broadcast receiving apparatus according to an embodiment of the present invention.

The embodiments of the present invention will be described in detail referring to the drawings. The embodiments below describe a digital broadcast receiving apparatus and a video display method.

(1) Configuration of Digital Broadcast Receiving Apparatus

FIG. 1 is a block diagram illustrating a configuration of a digital broadcast receiving apparatus according to an embodiment of the present invention.

As illustrated in FIG. 1, a digital broadcast receiving apparatus 100 includes a tuner 1, a separation circuit 2, a decoder 3, a main memory 4, a communication unit 5, an external storage device 6, a remote control light receiver 7, a controller 8, a scaler 9, a synthesizer 10, a graphical user interface (GUI) drawer 11, a frame buffer 12, a monitor 13, and a remote control 14.

In the digital broadcast receiving apparatus 100 illustrated in FIG. 1, an image for digital broadcasting, a GUI image for an application program, and a GUI image for a launcher can be displayed on a screen of the monitor 13. The launcher is an application program that enables one or a plurality of application programs to be started by an operation of one or a plurality of icons (operation buttons) displayed on the screen.

In the following description, the image for digital broadcasting is referred to as a television image, the GUI image for the application program is referred to as an application image, and the GUI image for the launcher is referred to as a launcher image. Video data for displaying the television image is referred to as television video data, video data for displaying the application image is referred to as application video data, and video data for displaying the launcher image is referred to as launcher video data. Further, the application program is abbreviated as an application, as needed.

The television image and the application image may be a moving image or may be a still image.

The tuner 1 subjects a broadcast signal for digital broadcasting fed from an antenna or a cable to tuning and demodulation. The separation circuit 2 separates MPEG (Moving Picture Experts Group) data and program additional information from the broadcast signal that has been subjected to the demodulation by the tuner 1. The MPEG data is fed to the decoder 3, and the program additional information is fed to the main memory 4. The decoder 3 decodes the MPEG data, and feeds video data and audio data to the controller 8. Description of processing of the audio data is hereinafter omitted.

The main memory 4 stores the program additional information separated by the separation circuit 2 and application video data, described below. The program additional information includes drawing information for generating launcher video data.

The communication unit 5 is connected to the Internet 120. The communication unit 5 acquires the MPEG data from a server connected to the Internet 120 and applies the acquired MPEG data to the decoder 3 when an application program, described below, is started.

The external storage device 6 stores various application programs. The application programs also include the application program serving as the launcher. The external storage device 6 may store the drawing information for generating the launcher video data. The drawing information may be image data in JPEG (Joint Photographic Experts Group) format, for example.

The remote control 14 is operated to issue various instructions relating to the digital broadcast receiving apparatus 100 by a user, and sends an infrared signal corresponding to a content of the instruction. The remote control light receiver 7 receives the infrared signal sent by the remote control 14, and issues an instruction corresponding to the infrared signal to the controller 8.

The controller 8 controls the main memory 4, the communication unit 5, the external storage device 6, the scaler 9, the synthesizer 10, the GUI drawer 11, and the frame buffer 12.

The scaler 9 processes television video data or application video data to change the vertical and horizontal sizes of the television image or the application image. Thus, the television image or the application image is enlarged or reduced in vertical and horizontal directions.

The GUI drawer 11 writes the launcher video data into the frame buffer 12 based on the drawing information by the control of the controller 8. The synthesizer 10 synthesizes the television video data or the application video data processed by the scaler 9 and the launcher video data stored in the frame buffer 12, and outputs synthesized video data. The monitor 13 displays an image on the screen based on the video data output from the synthesizer 10.

The main memory 4 and the frame buffer 12 are composed of a semiconductor memory such as a random access memory (RAM) or a nonvolatile memory. The external storage device 6 is composed of various recording media such as a hard disk or a memory card. The communication unit 5 is composed of a modem, a router, or the like. The monitor 13 is composed of various display devices such as a liquid crystal display device or a plasma display device.

All constituent elements in the digital broadcast receiving apparatus 100 illustrated in FIG. 1 may be composed of hardware such as an electronic circuit, and some of the constituent elements may be composed of a central processing unit (CPU) and a computer program. For example, functions of the controller 8, the scaler 9, the synthesizer 10, and the GUI drawer 11 may be implemented by a CPU and a computer program.

(2) Switching of Display State on Screen

A state where a television image is displayed on the whole screen of the monitor 13 is hereinafter referred to as a television display state, and a state where an application image is displayed on the whole screen of the monitor 13 is hereinafter referred to as an application display state. A state where the television image or the application image, together with a launcher image, is displayed on the screen of the monitor 13 is referred to as a launcher display state.

Further, a state where the television image, together with the launcher image, is displayed on the screen of the monitor 13 between the television display state and the launcher display state, and a state where the application image, together with the launcher image, is displayed on the screen of the monitor 13 between the application display state and the launcher display state is hereinafter referred to as an intermediate display state.

Figure 2:
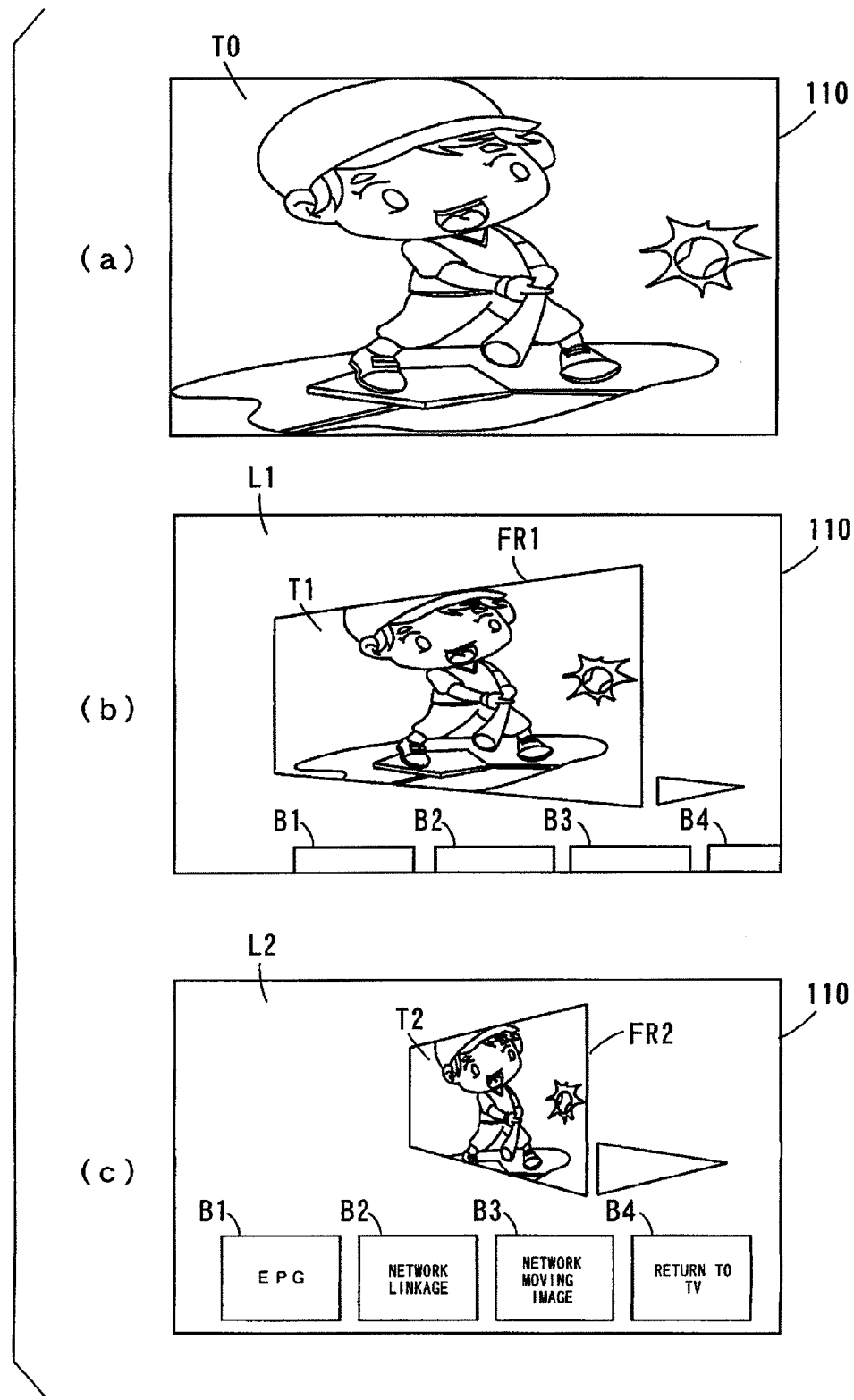
FIG. 2 is a schematic view illustrating an example of a display state on a screen at the time of switching from a television display state to a launcher display state by startup of a launcher.

(2-1) Switching from Television Display State to Launcher Display State by Startup of Launcher FIG. 2 is a schematic view illustrating an example of a display state on the screen at the time of switching from the television display state to the launcher display state by startup of a launcher.

FIG. 2 (*a*) illustrates an example of the television display state, FIG. 2 (*b*) illustrates an example of the intermediate display state, and FIG. 2 (*c*) illustrates an example of the launcher display state.

In the television display state illustrated in FIG. 2 (*a*), a television image T0 is displayed on the whole of a screen 110. In this state, when the user operates the remote control 14, to issue an instruction to start the launcher, the display state on the screen 110 transits to the intermediate display state illustrated in FIG. 2 (*b*).

In the intermediate display state illustrated in FIG. 2 (*b*), an intermediate launcher image L1 is displayed on the screen 110. The intermediate launcher image L1 includes an intermediate frame FR1, parts of a plurality of operation buttons B1, B2, B3, and B4. The intermediate frame FR1 has a shape different from that of the screen 110. In the present embodiment, the intermediate frame FR1 has a perspective shape of the screen 110. The maximum lengths in the vertical and horizontal directions of the intermediate frame FR1 are respectively smaller than the vertical and horizontal sizes of the screen 110. In this example, the intermediate frame FR1 has a laterally-facing trapezoidal shape. More specifically, the upper side and the lower side of the intermediate frame FR1 are inclined to the horizontal direction, and the left side and the right side thereof extend in the vertical direction.

In the intermediate frame FR1, a television image T1 obtained by reducing the television image T0 in the vertical direction and the horizontal direction is displayed.

The display state on the screen 110 transits to the launcher display state illustrated in FIG. 2 (*c*). In the launcher display state illustrated in FIG. 2 (*c*), a last launcher image L2 is displayed on the screen 110. The last launcher image L2 includes a display frame FR2 and a plurality of operation buttons B1, B2, B3, and B4. The display frame FR2 has a shape different from that of the screen 110. In the present embodiment, the display frame FR2 has a perspective shape of the screen 110. The maximum lengths in the vertical and horizontal directions of the display frame FR2 are respectively smaller than the maximum lengths in the vertical and horizontal directions of the intermediate frame FR1. In this example, the display frame FR2 has a shape similar to that of the intermediate frame FR1. The display frame FR2 may have a shape different from that of the intermediate frame FR1.

A television image T2 obtained by further reducing the television image T0 in the vertical direction and the horizontal direction is displayed in the display frame FR2.

In this example, the operation button B1 is assigned to an application program for displaying an electronic program guide (EPG). The operation button B2 is assigned to an application program for operating network linkage (external device control). The operation button B3 is assigned to an application program for displaying a network moving image. The operation button B4 is used to return to the television display state. The user can select any one of the operation buttons B1 to B4 by operating the remote control 14.

Processing for generating the launcher image by the scaler 9, the synthesizer 10, and the GUI drawer 11 illustrated in FIG. 1 and processing for switching from the television display state to the launcher display state will be described.

Figure 3:
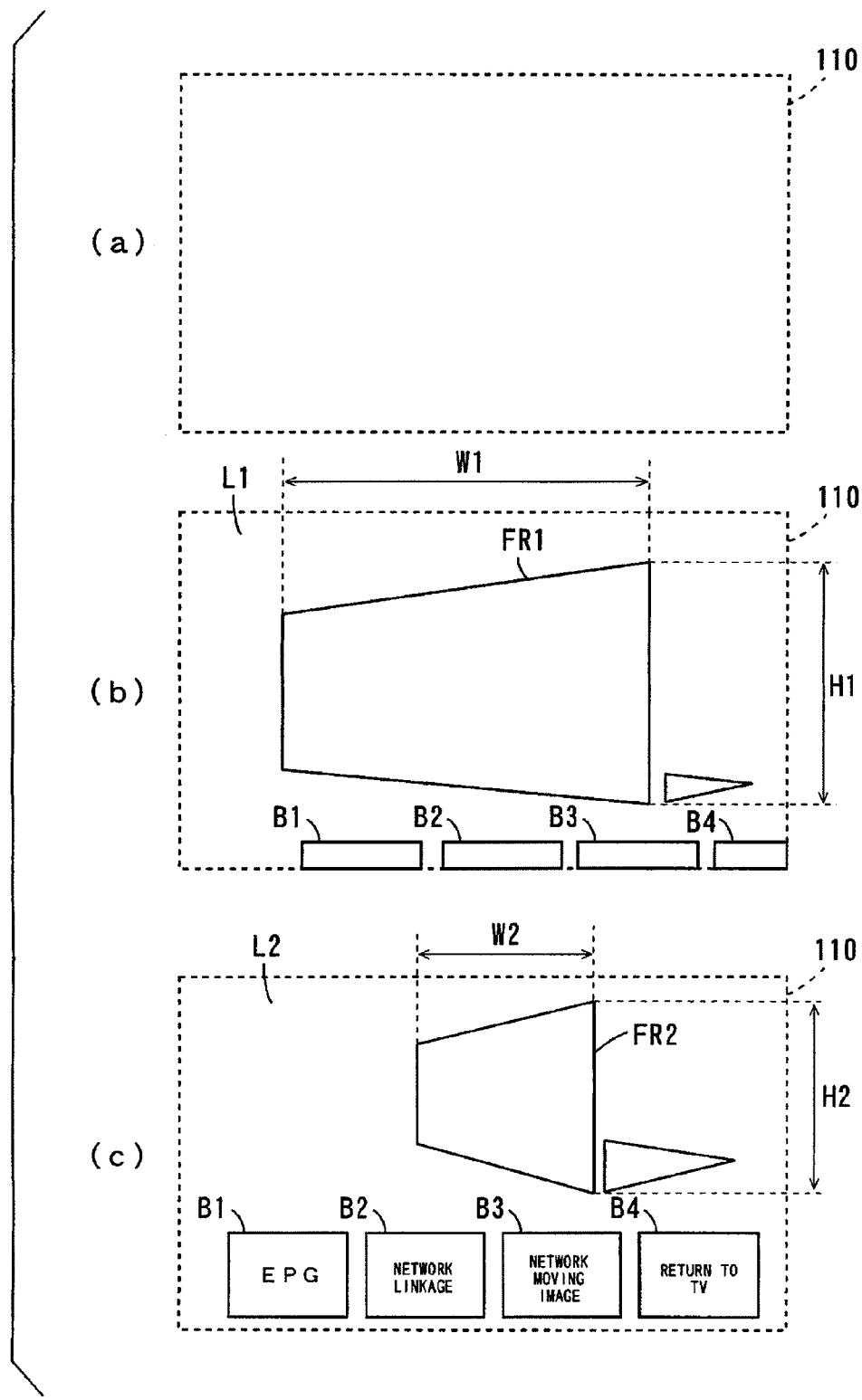
FIG. 3 is a schematic view illustrating an example of transition of a launcher image at the time of switching from a television display state to a launcher display state.

FIG. 3 is a schematic view illustrating an example of transition of a launcher image at the time of switching from the television display state to the launcher display state. FIG. 4 is a schematic view illustrating an example of transition of a television image at the time of switching from the television display state to the launcher display state.

In the television display state, the GUI drawer 11 does not write launcher video data into the frame buffer 12. Thus, the launcher image is not generated, as illustrated in FIG. 3 (*a*).

On the other hand, the scaler 9 outputs television video data without performing scaling processing. Thus, a television image T0 having the same vertical and horizontal sizes as those of the screen 110 is generated, as illustrated in FIG. 4 (*a*).

The synthesizer 10 synthesizes and outputs the television video data output from the scaler 9 and the launcher video data stored in the frame buffer 12. In this case, the frame buffer 12 does not store the launcher video data. Thus, the television image T0 is displayed on the whole screen 110, as illustrated in FIG. 2 (*a*).

In the intermediate display state, the GUI drawer 11 writes launcher video data for displaying an intermediate launcher image into the frame buffer 12. Thus, an intermediate launcher image L1 is generated, as illustrated in FIG. 3 (*b*).

On the other hand, the scaler 9 subjects the television video data to scaling processing. Thus, a television image T1 having the vertical and horizontal sizes smaller than those of the screen 110 is generated, as illustrated in FIG. 4 (*b*). The vertical size of the television image T1 is equal to the maximum length in the vertical direction H1 of an intermediate frame FR1 in the intermediate launcher image L1 and the horizontal size of the television image T1 is equal to the maximum length in the horizontal direction W1 of the intermediate frame FR1.

The synthesizer 10 synthesizes and outputs the television video data output from the scaler 9 and the launcher video data stored in the frame buffer 12. In this case, the television video data and the launcher video data are synthesized so that a portion corresponding to an area, in the intermediate frame FR1, of the television image T1 is displayed in the intermediate frame FR1. More specifically, the television video data is processed so that a portion corresponding to an area, outside the intermediate frame FR1, of the television image T1 is deleted. Thus, the intermediate frame FR1 is displayed on the screen 110 while the reduced television image T1 is displayed in the intermediate frame FR1, as illustrated in FIG. 2 (b).

In the launcher display state, the GUI drawer 11 writes launcher video data for displaying a last launcher image into the frame buffer 12. Thus, a last launcher image L2 is generated, as illustrated in FIG. 3 (c).

On the other hand, the scaler 9 subjects the television video data to scaling processing. Thus, a television image T2 having the vertical and horizontal sizes smaller than those of the screen 110 is generated, as illustrated in FIG. 4 (c). The vertical size of the television image T2 is equal to the maximum length in the vertical direction H2 of a display frame FR2 in the last launcher image L2, and the horizontal size of the television image T2 is equal to the maximum length in the horizontal direction W2 of the display frame FR2.

The synthesizer 10 synthesizes and outputs the television video data output from the scaler 9 and the launcher video data stored in the frame buffer 12. In this case, the television video data and the launcher video data are synthesized so that a portion corresponding to an area, in the display frame FR2, of the television image T2 is displayed in the display frame FR2. More specifically, the television video data is processed so that a portion corresponding to an area, outside the display frame FR2, of the television image T2 is deleted. Thus, the display frame FR2 is displayed on the screen 110 while the further reduced television image T2 is displayed in the display frame FR2, as illustrated in FIG. 2 (c).

FIG. 5 is a flowchart illustrating an operation of the controller 8 at the time of switching from a television display state to a launcher display state by startup of a launcher.

First, the controller 8 determines whether a last launcher image has been displayed when an instruction to start the launcher is issued in the television display state illustrated in FIG. 2 (a) (step S1). If the last launcher image has not been displayed, the controller 8 controls the GUI drawer 11 to write launcher video data into the frame buffer 12 (step S2). Thus, in the example illustrated in FIG. 3 (b), the GUI drawer 11 writes launcher video data corresponding to the intermediate launcher image L1 into the frame buffer 12. In the example illustrated in FIG. 3 (c), the GUI drawer 11 writes launcher video data corresponding to the last launcher image L2 into the frame buffer 12.

The controller 8 controls the scaler 9 to subject television video data to scaling processing (step S3). Thus, in the example illustrated in FIG. 4 (b), the scaler 9 subjects television video data corresponding to the television image T0 illustrated in FIG. 4 (a) to scaling processing, to generate television video data corresponding to the television image T1. In the example illustrated in FIG. 4 (c), the scaler 9 subjects the television video data corresponding to the television image T0 to scaling processing, to generate television video data corresponding to the television image T2.

Then, the controller 8 controls the synthesizer 10 to synthesize and output the launcher video data stored in the frame buffer 12 and the television video data generated by the scaler 9 (step S4). Thus, in the example illustrated in FIG. 2 (b), the intermediate launcher image L1 is displayed on the screen 110 of the monitor 13 while the reduced television image L1 is displayed in the intermediate frame FR1. In the example illustrated in FIG. 2 (c), the last launcher image L2 is displayed on the screen 110 of the monitor 13 while the further reduced television image T2 is displayed in the display frame FR2.

Then, the processing returns to step S1. If the last launcher image has been displayed in step S1, the processing ends.

If an instruction to end the launcher is issued by operating the remote control 14 in the launcher display state illustrated in FIG. 2 (c), the launcher display state illustrated in FIG. 2 (c) transits to the television display state illustrated in FIG. 2 (a) via the intermediate display state illustrated in FIG. 2 (b).

In this example, the reduced television image is displayed in the intermediate frame FR1 and the display frame FR2 having a perspective shape of the screen 110 in the intermediate display state and the launcher display state. Therefore, a stereoscopic effect of the television image can be obtained without performing complicated three-dimensional display. Therefore, a visual effect of the image can be enhanced at low cost.

The display state on the screen 110 is switched from the television display state to the launcher display state via the intermediate display state, and the display state on the screen 110 is switched from the launcher display state to the television display state via the intermediate display state. In this case, in the television display state, the intermediate display state, and the launcher display state, the television image is continuously displayed. Thus, continuity of the image can be ensured at the time of switching the image. As a result, an uncomfortable feeling due to an interruption of the image can be prevented from being given to the user.

Figure 6:
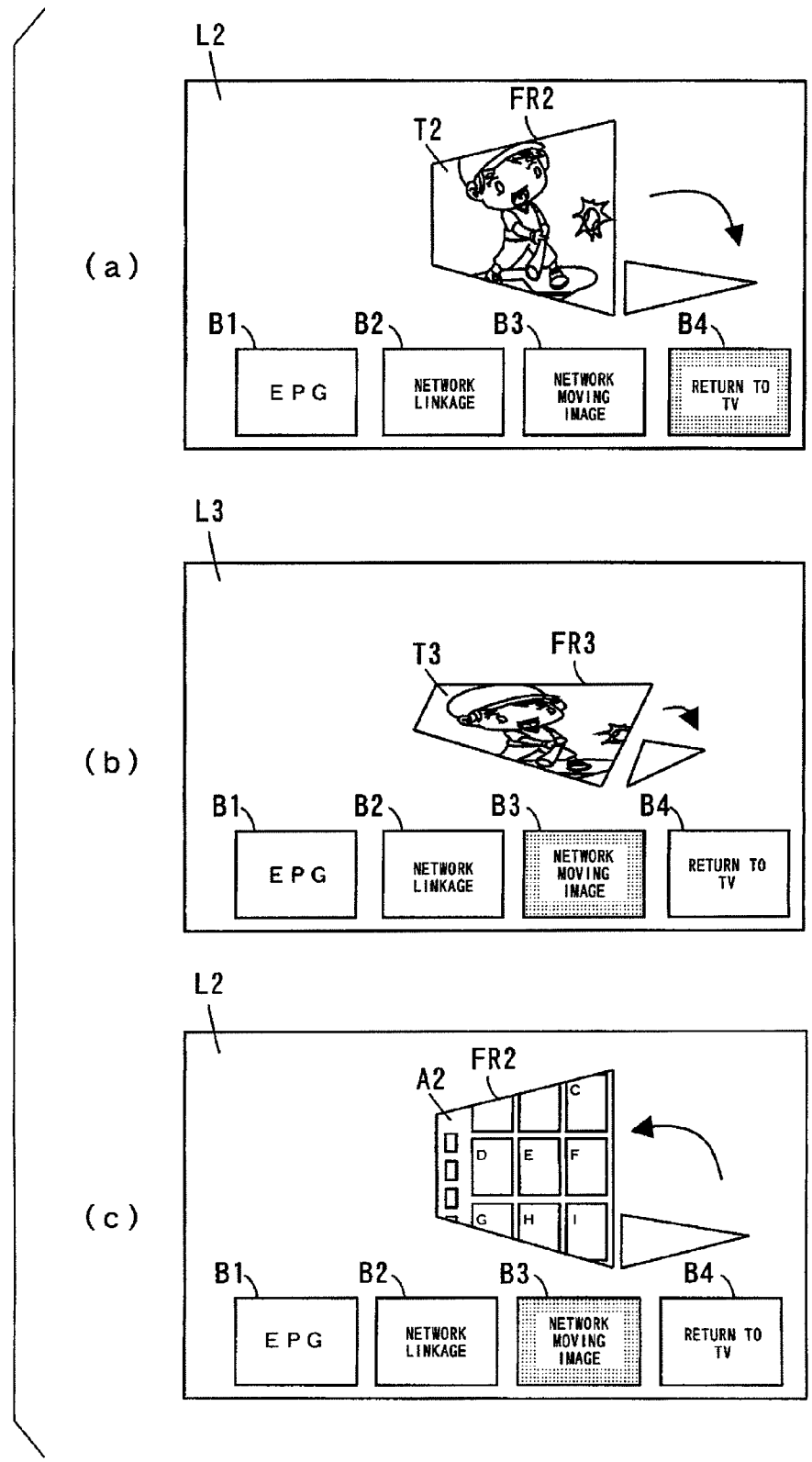
FIG. 6 is a schematic view illustrating an example of transition of a display state by an operation of an operation button in a launcher image.

(2-2) Transition of Display State of Launcher Image by Operation of Operation Button FIG. 6 is a schematic view illustrating an example of transition of a display state of a launcher image by an operation of an operation button.

FIG. 6 (a) illustrates an example of a state where a television image is displayed in a display frame in a launcher image, FIG. 6 (b) illustrates a state where a transient launcher image is displayed, and FIG. 6 (c) illustrates an example of a state where an application image is displayed in a display frame in a launcher image.

An image immediately after startup of an application program is referred to as an application image at the time of startup, and application video data corresponding to the application image at the time of startup is referred to as an application image at the time of startup. The main memory 4 stores the application video data corresponding to the application image at the time of startup at predetermined timing. Thus, an image (an application image at the time of startup) displayed on the screen 110 is captured as a still image immediately after startup of the application program.

In a launcher display state illustrated in FIG. 6 (a), an operation button B4 is in a selected state. In this case, a reduced television image T2 is displayed in a display frame FR2.

In this state, when the user brings an operation button B3 into a selected state by an operation of the remote control 14, a display state on the screen 110 transits to a launcher display state illustrated in FIG. 6 (b).

In the launcher display state illustrated in FIG. 6 (b), a transient launcher image L3 is displayed on the screen 110 of the monitor 13. The transient launcher image L3 includes a display frame FR3 and a plurality of operation buttons B1, B2, B3, and B4. In this example, the display frame FR3 has a perspective shape of the inclined screen 110.

A television image T3 obtained by reducing the television image T0 illustrated in FIG. 4 (a) in the vertical direction and the horizontal direction is displayed in the display frame FR3.

The display state on the screen 110 then transits to a launcher display state illustrated in FIG. 6 (c). In the launcher display state illustrated in FIG. 6 (c), a launcher image L2 is displayed on the screen 110 of the monitor 13. In this case, an operation button B3 is in a selected state. A reduced application image A2 at the time of startup is displayed in a display frame FR2. The application image A2 is a still image.

Figure 7:
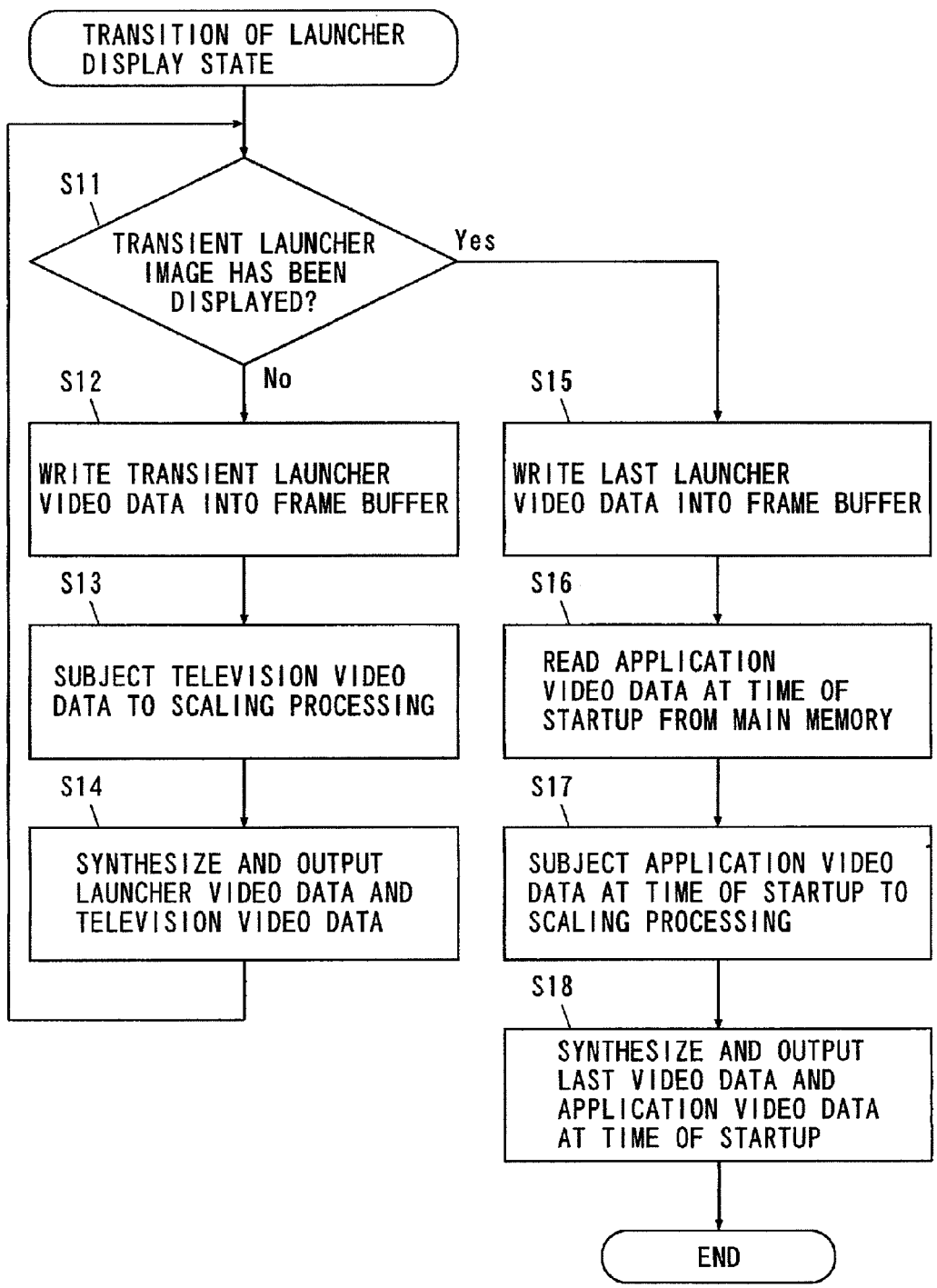
FIG. 7 is a flowchart illustrating an operation of a controller at the time of transition of a display state by an operation of an operation button in a launcher image.

FIG. 7 is a flowchart illustrating an operation of the controller 8 at the time of transition of a display state of a launcher image by an operation of an operation button.

First, the controller 8 determines whether a transient launcher image has been displayed when the operation button B3 in the launcher image L2 is brought into a selected state in the launcher display state illustrated in FIG. 6 (a) (step S11).

If the transient launcher image has not been displayed, the controller 8 controls the GUI drawer 11 to write launcher video data corresponding to the transient launcher image into the frame buffer 12 (step S12). Thus, in the example illustrated in FIG. 6 (b), the GUI drawer 11 writes launcher video data corresponding to the launcher image L3 into the frame buffer 12.

The controller 8 controls the scaler 9 to subject television video data to scaling processing (step S13). In the example illustrated in FIG. 6 (b), the scaler 9 subjects television video data corresponding to the television image T0 illustrated in FIG. 4 (a) to scaling processing, to generate television video data corresponding to the television image T3. In this case, the vertical and horizontal sizes of the television image T3 are respectively equal to the maximum length in the vertical direction and the maximum length in the horizontal direction of the display frame FR3 in the launcher image L3.

Then, the controller 8 controls the synthesizer 10 to synthesize and output the launcher video data stored in the frame buffer 12 and the television video data generated by the scaler 9 (step S14). In the example illustrated in FIG. 6 (b), the synthesizer 10 synthesizes and outputs the television video data and the launcher video data so that a portion corresponding to an area, in the display frame FR3, of the reduced television image T3 is displayed in the display frame FR3. In this case, the television video data is processed so that a portion corresponding to an area, outside the display frame FR3, of the television image T3 is deleted. Thus, the launcher image L3 is displayed on the screen 110 of the monitor 13 while the reduced television image T3 is displayed in the display frame FR3.

Then, the processing returns to step S11. If the transient launcher image has been displayed in step S11, the controller 8 controls the GUI drawer 11 to write launcher video data corresponding to a last launcher image into the frame buffer 12 (step S15). Thus, in the example illustrated in FIG. 6 (c), the GUI drawer 11 writes launcher video data corresponding to the launcher image L2 into the frame buffer 12.

The controller 8 reads application video data at the time of startup from the main memory 4 (step S16). Further, the controller 8 controls the scaler 9 to subject the read application video data at the time of startup to scaling processing (step S17). Thus, in the example illustrated in FIG. 6 (c), the scaler 9 subjects the application video data at the time of startup to scaling processing, to generate application video data corresponding to the application image A2 at the time of startup. In this case, the vertical and horizontal sizes of the application image A2 at the time of startup are respectively equal to the maximum length in the vertical direction and the maximum length in the horizontal direction of the display frame FR2 in the launcher image L2.

Then, the controller 8 controls the synthesizer 10 to synthesize and output the launcher video data stored in the frame buffer 12 and the application video data generated by the scaler 9 (step S18). Thus, in the example illustrated in FIG. 6 (c), the last launcher image L2 is displayed on the screen 110 of the monitor 13 while the reduced application image A2 is displayed in the display frame FR2. The application image A2 is a still image.

If the operation button B4 is brought into a selected state in the launcher display state illustrated in FIG. 6 (c), the launcher display state illustrated in FIG. 6 (c) transits to the launcher display state illustrated in FIG. 6 (a) via the launcher display state illustrated in FIG. 6 (b). In this case, the reduced application image at the time of startup is displayed based on the application video data at the time of startup previously stored in the main memory 4 in the transient display frame FR3 illustrated in FIG. 6 (b).

In this example, in the launcher display state, a state where the television image is displayed in the display frame FR2 is switched to a state where the application image (still image) is displayed in the display frame FR2 via a state where the television image is displayed in the transient display frame FR3, or a state where the application image (still image) is displayed in the display frame FR2 is switched to a state where the television image is displayed in the display frame FR2 via a state where the application image (still image) is displayed in the transient display frame FR3. In this case, the application image is displayed after the television image has fallen, and the television image is displayed after the application image has fallen. Thus, a visual effect at the time of switching of the image can be enhanced.

Figure 8:
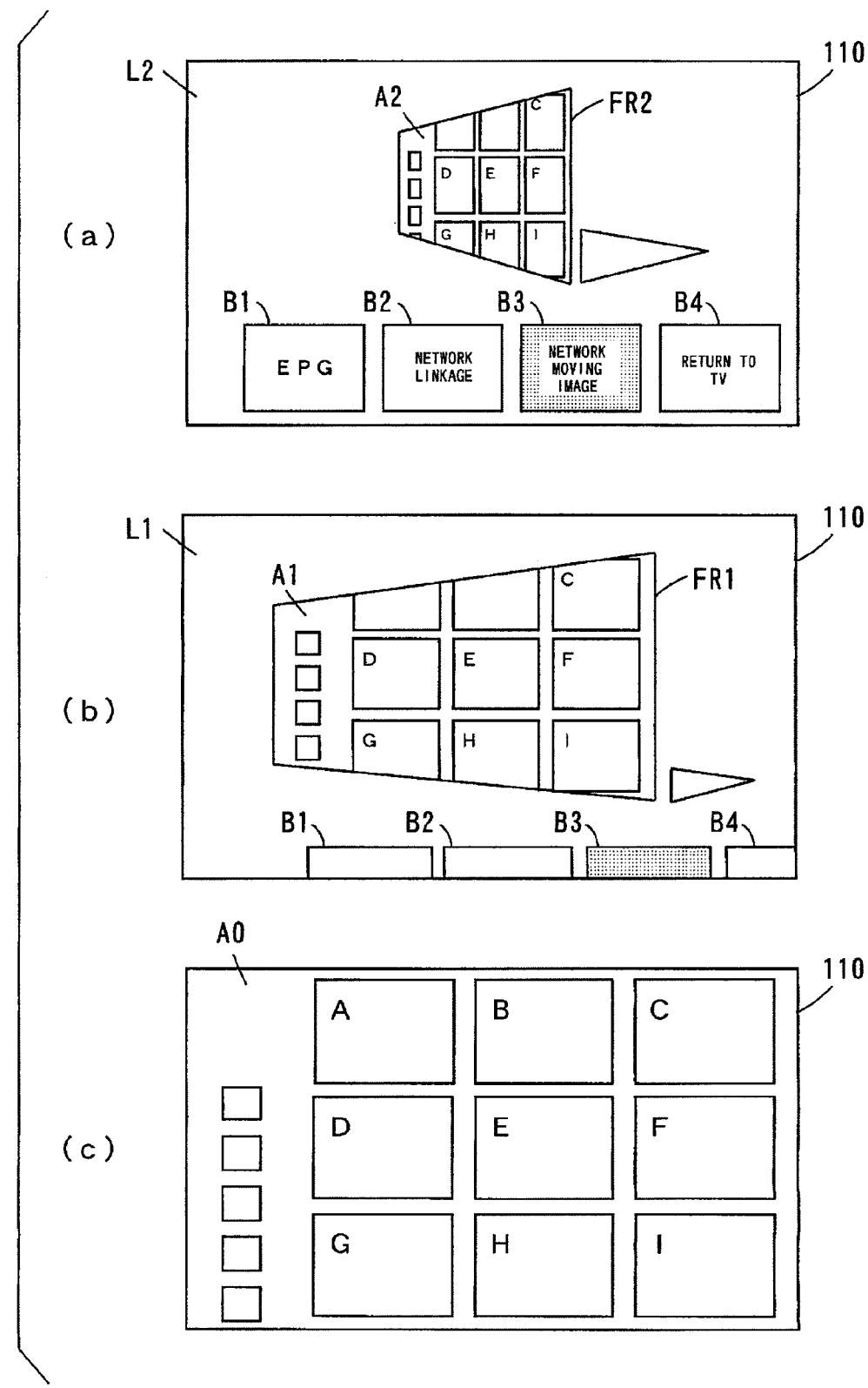
FIG. 8 is a schematic view illustrating an example of switching from a launcher display state to an application display state at the time of startup of an application.

(2-3) Switching of Launcher Display State to Application Display State at Time of Startup of Application FIG. 8 is a schematic view illustrating an example of switching from a launcher display state to an application display state at the time of startup of an application.

FIG. 8 (a) illustrates an example of the launcher display state, FIG. 8 (b) illustrates an example of an intermediate display state, and FIG. 8 (c) illustrates an example of the application display state.

An image for an application program during startup is referred to as an application image during startup, and application video data corresponding to the application image during startup is referred to as application video data during startup.

In the launcher display state illustrated in FIG. 8 (a), a launcher image L2 is displayed on the screen 110 of the monitor 13. As described above, the launcher image L2 includes a display frame FR2 and a plurality of operation buttons B1, B2, B3, and B4. In this case, in the display frame FR2, a reduced application image A2 is displayed based on the application video data at the time of startup previously stored in the main memory 4. The application image A2 is a still image. The operation button B3 is in a selected state.

In this state, when the user gives an instruction to start the application program by operating the remote control 14, the startup of the application program is started. A display state on the screen 110 transits to the intermediate display state illustrated in FIG. 8 (b). In the intermediate display state illustrated in FIG. 8 (b), an intermediate launcher image L1 is displayed on the screen 110 of the monitor 13. As described above, the intermediate launcher image L1 includes an intermediate frame FR1, parts of a plurality of operation buttons B1, B2, B3, and B4. The intermediate frame FR1 has a size that is made larger than that of the display frame FR2. In the intermediate frame FR1, a reduced application image A1 is displayed based on the application video data at the time of startup previously stored in the main memory 4. The application image A1 is a still image.

After the startup of the application program is completed, the display state on the screen 110 transits to the application display state illustrated in FIG. 8 (c). In the application display state illustrated in FIG. 8 (c), an application image A0 during startup is displayed on the whole screen 110 of the monitor 13. At this time, application video data corresponding to the application image A0 during startup is stored in the main memory 4 as application video data at the time of startup. Thus, an image (an application image at the time of startup) displayed on the screen 110 is captured as a still image immediately after startup of the application program.

Figure 9:
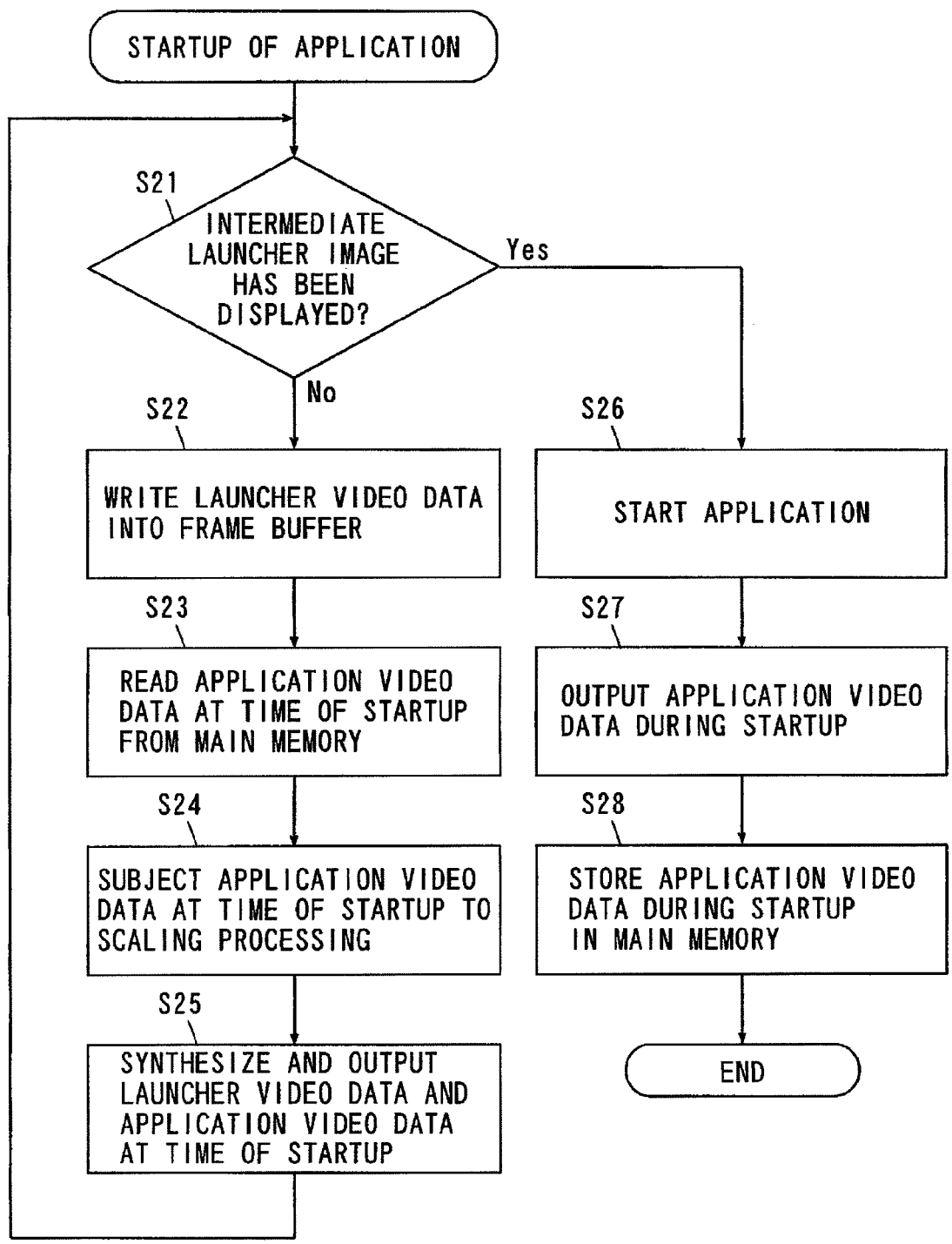
FIG. 9 is a flowchart illustrating an operation of a controller at the time of switching from a launcher display state to an application display state at the time of startup of an application.

FIG. 9 is a flowchart illustrating an operation of the controller 8 at the time of switching from a launcher display state to an application display state at the time of startup of an application.

First, the controller 8 determines whether an intermediate launcher image has been displayed when an instruction to start an application program is issued in the launcher display state illustrated in FIG. 8 (a) (step S21). If the intermediate launcher image has not been displayed, the controller 8 controls the GUI drawer 11 to write launcher video data into the frame buffer 12 (step S22). Thus, in the example illustrated in FIG. 8 (b), the GUI drawer 11 writes launcher video data for displaying the intermediate launcher image L1 into the frame buffer 12.

The controller 8 reads application video data at the time of startup from the main memory 4 (step S23). Further, the controller 8 controls the scaler 9 to subject the read application video data to scaling processing (step S24). Thus, in the example illustrated in FIG. 8 (b), the scaler 9 subjects the read application video data to scaling processing, to generate application video data at the time of startup corresponding to the application image A1 at the time of startup.

Then, the controller 8 controls the synthesizer 10 to synthesize and output the launcher video data stored in the frame buffer 12 and the application video data at the time of startup generated by the scaler 9 (step S25). Thus, in the example illustrated in FIG. 8 (b), the intermediate launcher image L1 is displayed on the screen 110 of the monitor 13 while the reduced application image A1 at the time of startup is displayed in the intermediate frame FR1.

Then, the processing returns to step S21. If the intermediate launcher image has been displayed in step S21, the controller 8 starts an application program corresponding to the operation button B3 (step S26). Thus, MPEG data representing the application program during startup is fed to the decoder 3 via the communication unit 5 illustrated in FIG. 1. The decoder 3 decodes the MPEG data, and feeds the application video data during startup to the scaler 9 via the controller 8.

The controller 8 controls the scaler 9 and the synthesizer 10 to output the application video data during startup fed from the decoder 3 illustrated in FIG. 1 (step S27). In this case, the GUI drawer 11 does not write the launcher video data into the frame buffer 12. On the other hand, the scaler 9 feeds the application video data to the synthesizer 10 without performing scaling processing. As a result, in the example illustrated in FIG. 8 (c), the application image A0 during startup is displayed on the whole screen 110 of the monitor 13.

The controller 8 stores the application video data during startup in the main memory 4 (step S28). Thus, an image (an application image at the time of startup) displayed on the screen 110 is captured as a still image immediately after the application program is started.

In this example, if an instruction to start the application program is issued, the application image at the time of startup (the still image) is displayed in the display frame FR2 and the intermediate frame FR1 based on the application video data stored in the main memory 4 in the launcher display state and the intermediate display state, and the application image during startup is displayed on the screen 110 based on the application video data generated by the decoder 3 in the application display state.

Even if the application program is not thus started in the launcher display state and the intermediate display state, the application image at the time of startup and the application image during startup are continuously displayed in the launcher display state, the intermediate display state, and the application display state. Thus, at the time of startup of the application program, an uncomfortable feeling due to an interruption of the image can be prevented from being given to the user.

Figure 10:
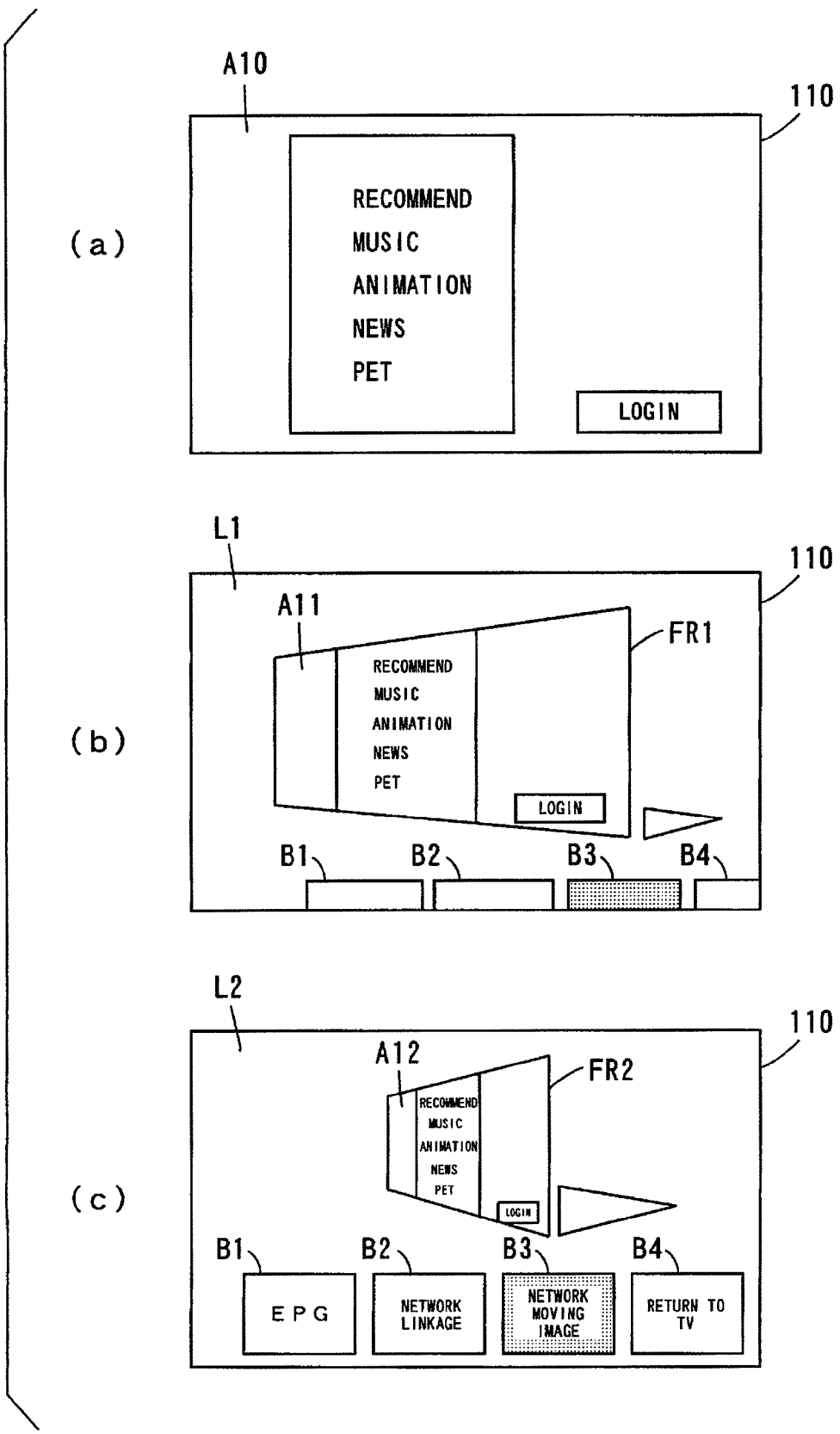
FIG. 10 is a schematic view illustrating an example of switching from an application display state to a launcher display state during startup of an application.

(2-4) Switching from Application Display State to Launcher Display State during Startup of Application FIG. 10 is a schematic view illustrating an example of switching from an application display state to a launcher display state during startup of an application.

FIG. 10 (a) illustrates an example of the application display state, FIG. 10 (b) illustrates an example of an intermediate display state, and FIG. 10 (c) illustrates an example of the launcher display state.

An image for an application program during startup displayed on the screen 110 immediately before transition to the launcher display state is referred to as an application image before transition to the launcher display state, and application video data corresponding to the application image before transition to the launcher display state is referred to as application video data before transition to the launcher display state.

In the application display state illustrated in FIG. 10 (a), an application image A10 during startup is displayed on the whole screen 110 of the monitor 13.

In this state, when the user gives an instruction to start a launcher by operating the remote control 14, the application video data before transition to the launcher display state is stored in the main memory 4. Thus, an image displayed on the screen 110 immediately before transition to the launcher display state (an application image before transition to the launcher display state) is captured as a still image. Then, a display state on the screen 110 transits to the intermediate display state illustrated in FIG. 10 (b).

In the intermediate display state illustrated in FIG. 10 (b), an intermediate launcher image L1 is displayed on the screen 110 of the monitor 13. As described above, the intermediate launcher image L1 includes an intermediate frame FR1, parts of a plurality of operation buttons B1, B2, B3, and B4. In the intermediate frame FR1, an application image A11, which has been reduced based on the application video data before transition to the launcher display state stored in the main memory 4, is displayed. The application image A11 is a still image.

Then, the display state on the screen 110 of the monitor 13 transits to the launcher display state illustrated in FIG. 10 (c). In the launcher display state illustrated in FIG. 10 (c), a last launcher image L2 is displayed on the screen 110 of the monitor 13. As described above, the last launcher image L2 includes a display frame FR2 and a plurality of operation buttons B1, B2, B3, and B4. In this case, in the display frame FR2, an application image A12, which has been reduced based on the application video data stored in the main memory 4 before transition to the launcher display state, is displayed. The application image A12 is a still image.

In the launcher display state illustrated in FIG. 10 (c), the application program is being started. In this case, when the user gives an instruction to end the launcher by operating the remote control 14, the display state on the screen 110 transits to the intermediate display state illustrated in FIG. 10 (b).

In the intermediate display state illustrated in FIG. 10 (b), the intermediate launcher image L1 is displayed on the screen 110 of the monitor 13. In the intermediate frame FR1, the application image A11 obtained by reducing the application image A10 before transition to the launcher display state in the vertical direction and the horizontal direction is displayed.

Then, the display state on the screen 110 of the monitor 13 transits to the application display state illustrated in FIG. 10 (a). In the application display state illustrated in FIG. 10 (a), the application image A10 during startup is displayed on the whole screen 110 of the monitor 13.

Figure 11:
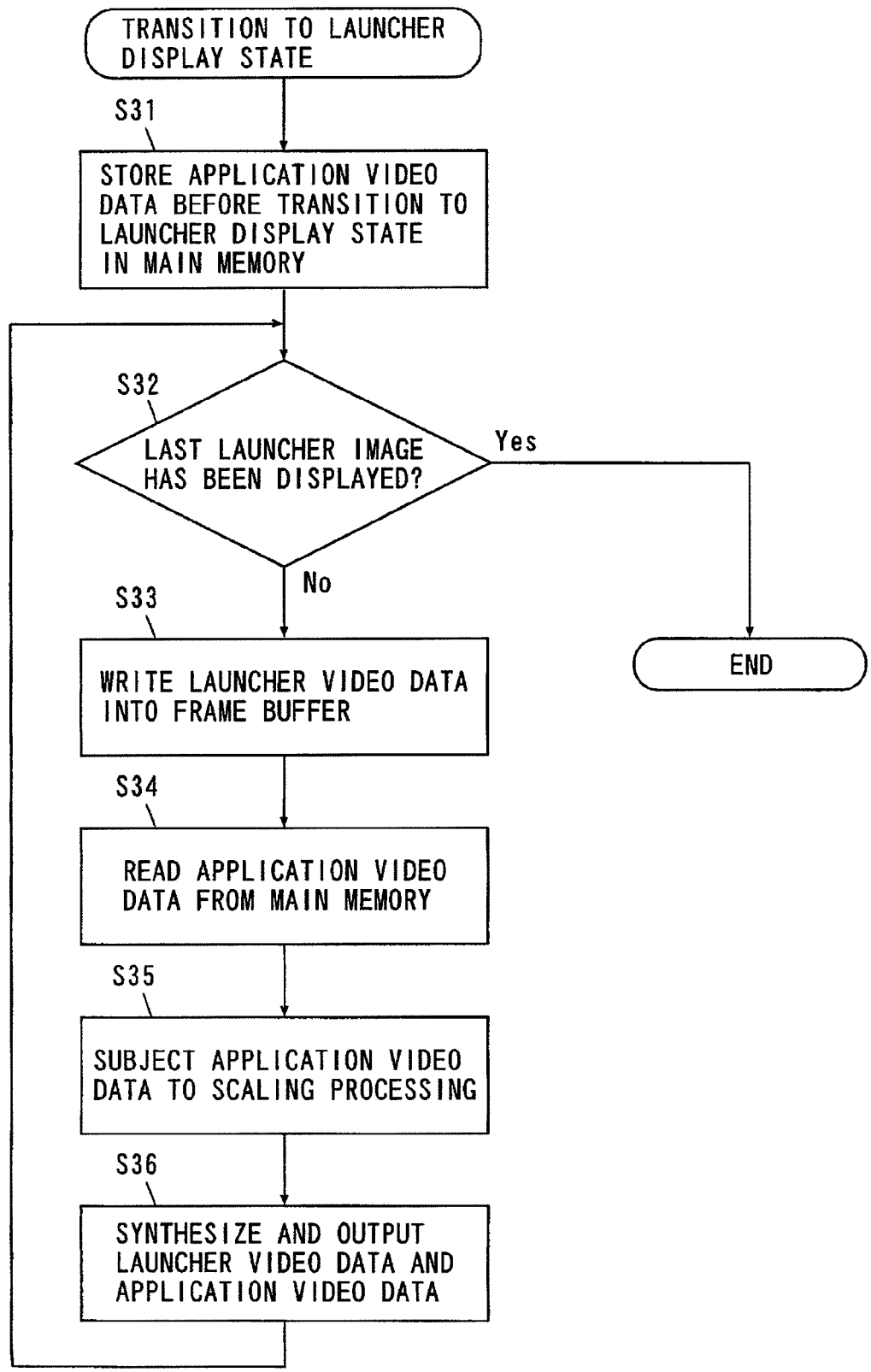
FIG. 11 is a flowchart illustrating an operation of a controller at the time of switching from an application display state to a launcher display state during startup of an application.

FIG. 11 is a flowchart illustrating an operation of the controller 8 at the time of switching from an application display state to a launcher display state during startup of an application.

First, the controller 8 stores application video data before transition to the launcher display state in the main memory 4 when an instruction to start a launcher is issued in the application display state illustrated in FIG. 10 (a) (step S31). In the example illustrated in FIG. 10 (a), application video data during startup corresponding to the application image A10 during startup displayed on the screen 110 of the monitor 13 is stored in the main memory 4. Thus, an image displayed on the screen 110 immediately before transition to the launcher display state (an application image before transition to the launcher display state) is captured as a still image.

Then, the controller 8 determines whether a last launcher image has been displayed (step S32). If the last launcher image has not been displayed, the controller 8 controls the GUI drawer 11 to write launcher video data into the frame buffer 12 (step S33). Thus, in the example illustrated in FIG. 10 (b), the GUI drawer 11 writes launcher video data corresponding to the intermediate launcher image L1 into the frame buffer 12. In the example illustrated in FIG. 10 (c), the GUI drawer 11 writes launcher video data corresponding to the last launcher image L2 into the frame buffer 12.

The controller 8 reads the application video data before transition to the launcher display state from the main memory 4 (step S34). Further, the controller 8 further controls the scaler 9 to subject the read application video data to scaling processing (step S35). Thus, in the example illustrated in FIG. 10 (b), the scaler 9 subjects the application video data to scaling processing, to generate application video data corresponding to the application image A11. In the example illustrated in FIG. 10 (c), the scaler 9 subjects the application video data to scaling processing, to generate application video data corresponding to the application image A12.

Then, the controller 8 controls the synthesizer 10 to synthesize and output the launcher video data stored in the frame buffer 12 and the application video data generated by the scaler 9 (step S36). Thus, in the example illustrated in FIG. 10 (b), the intermediate launcher image L1 is displayed on the screen 110 of the monitor 13 while the reduced application image A11 is displayed in the intermediate frame FR1. In the example illustrated in FIG. 10 (c), the last launcher image L2 is displayed on the screen 110 of the monitor 13 while the reduced application image A12 is displayed in the display frame FR2.

Then, the processing returns to step S32. If the last launcher image has been displayed in step S32, the processing ends.

In this example, if an instruction to start the launcher is issued, the application image during startup is displayed on the screen 110 based on the application video data generated by the decoder 3 in the application display state, and an application image before transition to the launcher display state (a still image) is displayed in the intermediate frame FR1 and the display frame FR2 based on the application video data stored in the main memory 4 in the intermediate display state and the launcher display state.

Thus, the application image during startup in the application display state, the intermediate display state, and the launcher display state and the application image before transition to the launcher display state are continuously displayed. Thus, an uncomfortable feeling due to an interruption of the image can be prevented from being given to the user at the time of switching from the application display state to the launcher display state.

Figure 12:
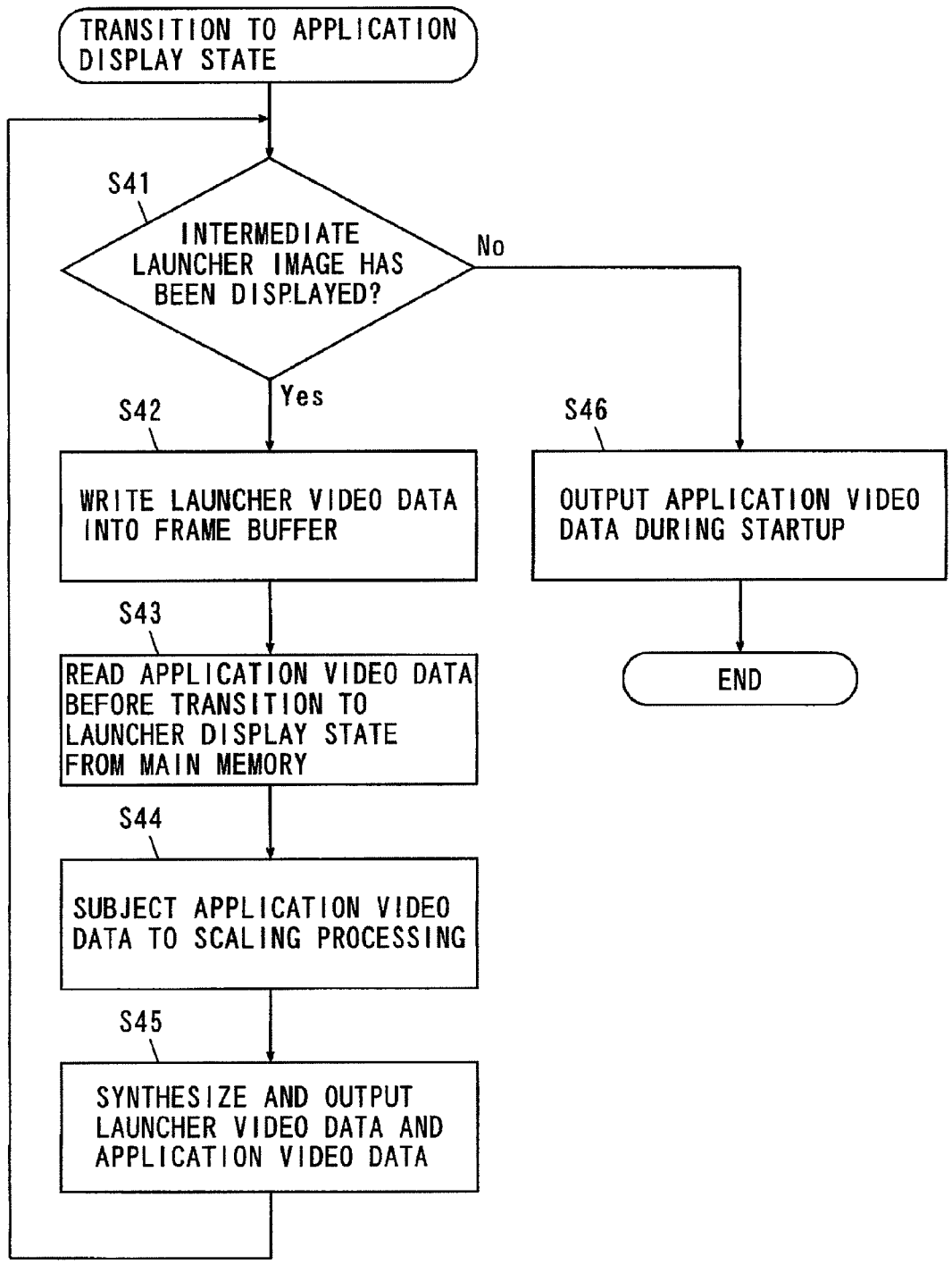
FIG. 12 is a flowchart illustrating an operation of a controller at the time of switching from a launcher display state to an application display state during startup of an application.

FIG. 12 is a flowchart illustrating an operation of the controller 8 at the time of switching from a launcher display state to an application display state during startup of an application.

First, the controller 8 determines whether an intermediate launcher image has been displayed when an instruction to end a launcher is issued in the launcher display state illustrated in FIG. 10 (c) (step S41). If the intermediate launcher image has not been displayed, the controller 8 controls the GUI drawer 11 to write launcher video data into the frame buffer 12 (step S42). Thus, in the example illustrated in FIG. 10 (b), the GUI drawer 11 writes intermediate launcher video data corresponding to the intermediate launcher image L1 into the frame buffer 12.

The controller 8 reads application video data before transition to the launcher display state from the main memory 4 (step S43). Further, the controller 8 controls the scaler 9 to subject the read application video data to scaling processing (step S44). Thus, in the example illustrated in FIG. 10 (b), the scaler 9 subjects the read application video data to scaling processing, to generate application video data corresponding to the application image A11.

Then, the controller 8 controls the synthesizer 10 to synthesize and output the launcher video data stored in the frame buffer 12 and the application video data generated by the scaler 9 (step S45). Thus, in the example illustrated in FIG. 10 (b), the intermediate launcher image L1 is displayed on the screen 110 of the monitor 13 while the reduced application image A11 is displayed in the intermediate frame FR1.

Then, the processing returns to step S41. If the intermediate launcher image has been displayed in step S41, the controller 8 controls the scaler 9 and the synthesizer 10 to output the application video data during startup fed from the decoder 3 illustrated in FIG. 1 (step S46). In this case, the GUI drawer 11 does not write the launcher video data into the frame buffer 12. On the other hand, the scaler 9 feeds the application video data to the synthesizer 10 without performing scaling processing. As a result, in the example illustrated in FIG. 10 (a), the application image A10 during startup is displayed on the whole screen 110 of the monitor 13.

In this example, if an instruction to end the launcher is issued, an application image before transition to the launcher display state (a still image) is displayed in the display frame FR2 and the intermediate frame FR1 based on the application video data stored in the main memory 4 in the launcher display state and the intermediate display state, and an application image during startup is displayed on the screen 110 based on the application video data generated by the decoder 3 in the application display state.

Thus, the application image before transition to the launcher display state and the application image during startup are continuously displayed in the launcher display state, the intermediate display state, and the application display state. Thus, at the time of switching from the launcher display state to the application display state, an uncomfortable feeling due to an interruption of the image can be prevented from being given to the user.

Figure 13:
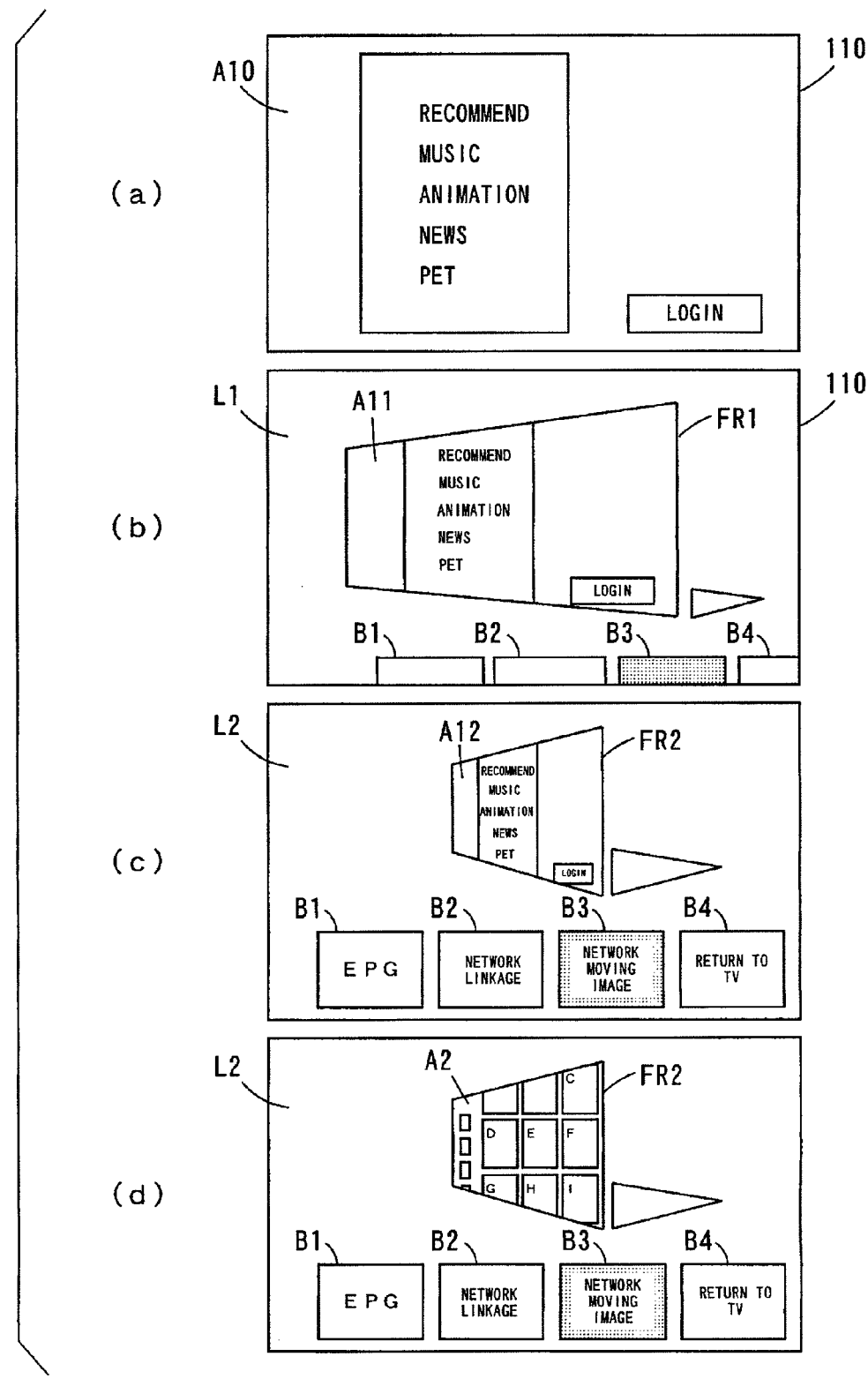
FIG. 13 is a schematic view illustrating an example of switching from an application display state to a launcher display state at the end of an application.

(2-5) Switching from Application Display State to Launcher Display State at End of Application FIG. 13 is a schematic view illustrating an example of switching from an application display state to a launcher display state at the end of an application.

FIG. 13 (*a*) illustrates an example of the application display state, FIG. 13 (*b*) illustrates an example of an intermediate display state, and FIGS. 13 (*c*) and 13 (*d*) illustrate an example of the launcher display state.

An image displayed on the screen 110 immediately before the end of an application program is referred to as an application image at the time of the end, and application video data corresponding to the application image at the time of the end is referred to as application video data at the time of the end.

In the application display state illustrated in FIG. 13 (*a*), an application image A10 during startup is displayed on the whole screen 110 of the monitor 13.

In this state, when the user gives an instruction to end the application program by operating the remote control 14, the application video data during startup is stored as the application video data at the time of the end in the main memory 4. Thus, an image displayed on the screen 110 immediately before the end of the application program (an application image at the time of the end) is captured as a still image. Then, a display state on the screen 110 transits to the intermediate display state illustrated in FIG. 13 (*b*).

In the intermediate display state illustrated in FIG. 13 (*b*), an intermediate launcher image L1 is displayed on the screen 110 of the monitor 13. As described above, the intermediate launcher image L1 includes an intermediate frame FR1, parts of a plurality of operation buttons B1, B2, B3, and B4. In the intermediate frame FR1, an application image A11, which has been reduced based on the application video data at the time of the end stored in the main memory 4, is displayed. The application image A11 is a still image.

Then, the display state on the screen 110 of the monitor 13 transits to the launcher display state illustrated in FIG. 13 (*c*). In the launcher display state illustrated in FIG. 13 (*c*), a last launcher image L2 is displayed on the screen 110 of the monitor 13. As described above, the last launcher image L2 includes a display frame FR2 and a plurality of operation buttons B1, B2, B3, and B4. In this case, in the display frame FR2, an application image A12 at the time of the end, which has been reduced based on the application video data at the time of the end stored in the main memory 4, is displayed. The application image A12 is a still image.

Further, the display state on the screen 110 of the monitor 13 transits to the launcher display state illustrated in FIG. 13 (*d*). In the launcher display state illustrated in FIG. 13 (*d*), an application image A2 at the time of startup, which has been reduced based on the application video data at the time of startup stored in the main memory 4, is displayed in the display frame FR2 in the last launcher image L2. The application image A2 is a still image.

Figure 14:
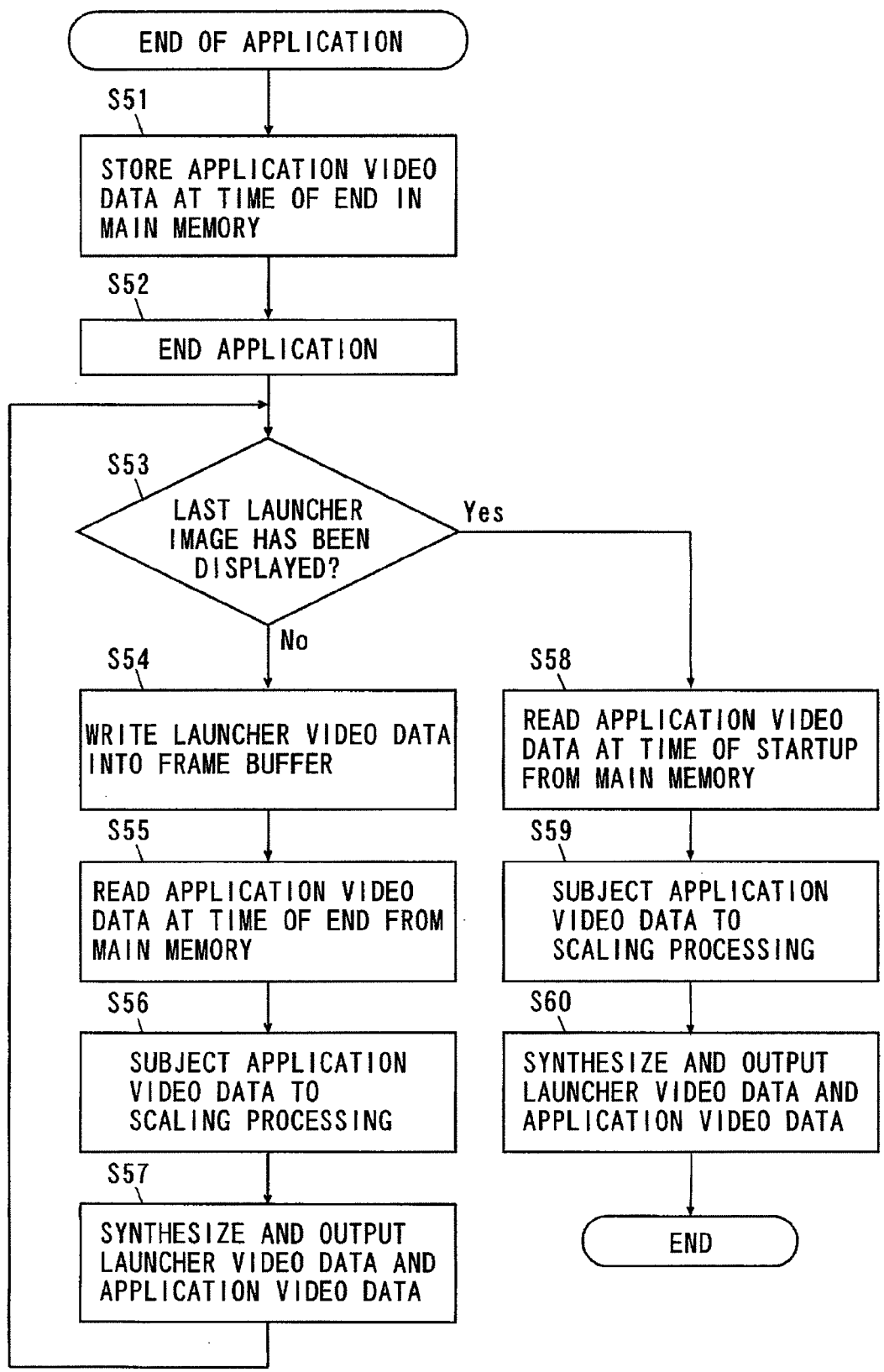
FIG. 14 is a flowchart illustrating an operation of a controller at the time of switching from an application display state to a launcher display state at the end of an application.

FIG. 14 is a flowchart illustrating an operation of the controller 8 at the time of switching from an application display state at the end of an application to a launcher display state.

First, the controller 8 stores application video data at the time of the end in the main memory 4 when an instruction to end an application program is issued in the application display state illustrated in FIG. 13 (*a*) (step S51). In the example illustrated in FIG. 13 (*a*), application video data corresponding to the application image A10 displayed on the screen 110 of the monitor 13 is stored in the main memory 4. Thus, an image displayed on the screen 110 immediately before the end of the application program (an application image at the time of the end) is captured as a still image. Then, the controller 8 ends the application program during startup (step S52).

Then, the controller 8 determines whether a last launcher image has been displayed (step S53). If the last launcher image has not been displayed, the controller 8 controls the GUI drawer 11 to write launcher video data into the frame buffer 12 (step S54). Thus, in the example illustrated in FIG. 13 (*b*), the GUI drawer 11 writes launcher video data corresponding to the intermediate launcher image L1 into the frame buffer 12. In the example illustrated in FIG. 13 (*c*), the GUI drawer 11 writes launcher video data corresponding to the last launcher image L2 into the frame buffer 12.

The controller 8 reads application video data at the time of the end from the main memory 4 (step S55). Further, the controller 8 controls the scaler 9 to subject the read application video data to scaling processing (step S56). Thus, in the example illustrated in FIG. 13 (*b*), the scaler 9 subjects the application video data to scaling processing, to generate application video data corresponding to the application image A11. In the example illustrated in FIG. 13 (*c*), the scaler 9 subjects the application video data to scaling processing, to generate application video data corresponding to the application image A12.

Then, the controller 8 controls the synthesizer 10 to synthesize and output the launcher video data stored in the frame buffer 12 and the application video data generated by the scaler 9 (step S57). Thus, in the example illustrated in FIG. 13 (*b*), the intermediate launcher image L1 is displayed on the screen 110 of the monitor 13 while the reduced application image A11 is displayed in the intermediate frame FR1. In the example illustrated in FIG. 13 (*c*), the last launcher image L2 is displayed on the screen 110 of the monitor 13 while the reduced application image A12 is displayed in the display frame FR2.

Then, the processing returns to step S53. If the last launcher image has been displayed in step S53, the controller 8 reads application video data at the time of startup from the main memory 4 (step S58). Further, the controller 8 controls the scaler 9 to subject the read application video data to scaling processing (step S59). Thus, in the example illustrated in FIG. 13 (*d*), the scaler 9 subjects the application video data to scaling processing, to generate application video data corresponding to the application image A2.

Then, the controller 8 controls the synthesizer 10 to synthesize and output the launcher video data stored in the frame buffer 12 and the application video data generated by the scaler 9 (step S60). Thus, in the example illustrated in FIG. 13 (*d*), the last launcher image L2 is displayed on the screen 110 of the monitor 13 while the reduced application image A2 is displayed in the display frame FR2.

In this example, if an instruction to end the application program is issued, the application image during startup is displayed on the screen 110 based on the application video data generated by the decoder 3 in the application display state, an application image at the time of the end (a still image) is displayed in the intermediate frame FR1 and the display frame FR2 based on the application video data stored in the main memory 4 in the intermediate display state and the application display state, and an application image at the time of startup (a still image) is then displayed in the display frame FR2 based on the application video data stored in the main memory 4.

The application image during startup and the application image at the time of the end are thus continuously displayed in the application display state, the intermediate display state, and the launcher display state. Thus, at the end of the application program, an uncomfortable feeling due to an interruption of the image can be prevented from being given to the user.

After the end of the application program, the application image at the time of startup is displayed in the display frame FR2. If an instruction to start the application program is then issued, therefore, the application image at the time of startup and the application image during startup are continuously displayed. Thus, continuity of the image can be ensured in a period elapsed from the end of the application program until the subsequent startup of the application program.

(3) Effect of Embodiment (a) In the digital broadcast receiving apparatus according to the present embodiment, the application video data corresponding to the application image during startup is stored in the main memory 4 at predetermined timing, and the application image (still image) is displayed in the intermediate frame FR1 and the display frame FR2 based on the application video data stored in the main memory 4 in the intermediate display state and the launcher display state. Even if the application program is not started in the intermediate display state and the launcher display state, therefore, the application image is continuously displayed in the application display state, the intermediate display state, and the launcher display state. Therefore, continuity of the image can be ensured at the time of switching between the application display state and the launcher display state. As a result, an uncomfortable feeling due to an interruption of the image can be prevented from being given to the user.

(b) The display state on the screen 110 is switched from the television display state to the launcher display state via the intermediate display state, or is switched from the launcher display state to the television display state via the intermediate display state. In this case, the television image is continuously displayed in the television display state, the intermediate display state, and the launcher display state. Thus, continuity of the image can be ensured at the time of switching of the image. As a result, an uncomfortable feeling due to an interruption of the image can be prevented from being given to the user.

The display state on the screen 110 is switched from the application display state to the launcher display state via the intermediate display state, or is switched from the launcher display state to the application display state via the intermediate display state. In this case, the application image is continuously displayed in the application display state, the intermediate display state, and the launcher display state. Thus, continuity of the image can be ensured at the time of switching of the image. As a result, an uncomfortable feeling due to an interruption of the image can be prevented from being given to the user.

(c) Further, the intermediate frame FR1 has a size smaller than that of the screen 110 and larger than that of the display frame FR2. Thus, the size of the television image or the application image is changed in a step-by-step manner at the time of switching between the television display state or the application display state and the launcher display state. Therefore, continuity of the image can be ensured at the time of switching between the television display state or the application display state and the launcher display state while a visual effect can be enhanced.

(d) A reduced television image or application image is displayed in the intermediate frame FR1 and the display frame FR2 having a perspective shape of the screen 110 in the intermediate display state and the launcher display state.

In this case, the scaler 9 has a function of changing the vertical and horizontal sizes of the television image or the application image, and can be manufactured at lower cost than a graphic processor for performing complicated three-dimensional display of an image. On the other hand, if the television image or the application image is displayed in the intermediate frame FR1 and the display frame FR2 without being reduced, an uncomfortable feeling is produced.

In the present embodiment, the reduced television image or application image is displayed in the intermediate frame FR1 and the display frame FR2 having a perspective shape of the screen 110, as described above. Therefore, an uncomfortable feeling can be reduced while an image directed toward the front can be displayed to be obliquely directed in a pseudo manner. Thus, a stereoscopic effect of the television image and the application image can be obtained without performing complicated three-dimensional display. As a result, a visual effect of the image can be enhanced at low cost.

(e) Processing for reducing the vertical and horizontal sizes of the television image or the application image can be performed in a short time. Even if the television image or the application image is a moving image, therefore, the reduced moving image can be displayed by processing for a short time in the intermediate frame FR1 and the display frame FR2. As a result, an uncomfortable feeling due to an interruption of the image can be prevented from being given to the user.

(f) In the launcher display state, the television image or the application image is displayed in the display frame FR2 while the operation buttons B1 to B4 are displayed on the screen 110. Therefore, the user can operate the operation buttons B1 to B4 while seeing the television image or the application image.

Particularly, the user can give an instruction to start the application program by operating the operation buttons B1 to B3. Thus, the application image can be easily displayed in the display frame FR2.

(g) The operation buttons B1 to B4 move to gradually appear at the time of transition from the intermediate display state to the launcher display state, and move to gradually disappear at the time of transition from the launcher display state to the intermediate display state. Therefore, a visual effect can be further enhanced.

(4) Other Embodiments (a) A shape of a display frame of a launcher image is not limited to the shape of the display frame FR2 illustrated in FIG. 2 (c). For example, it may be another shape such as a perspective shape of the screen 110. For example, the display frame of the launcher image may have shapes illustrated in FIGS. 15 to 18.

Figure 15:
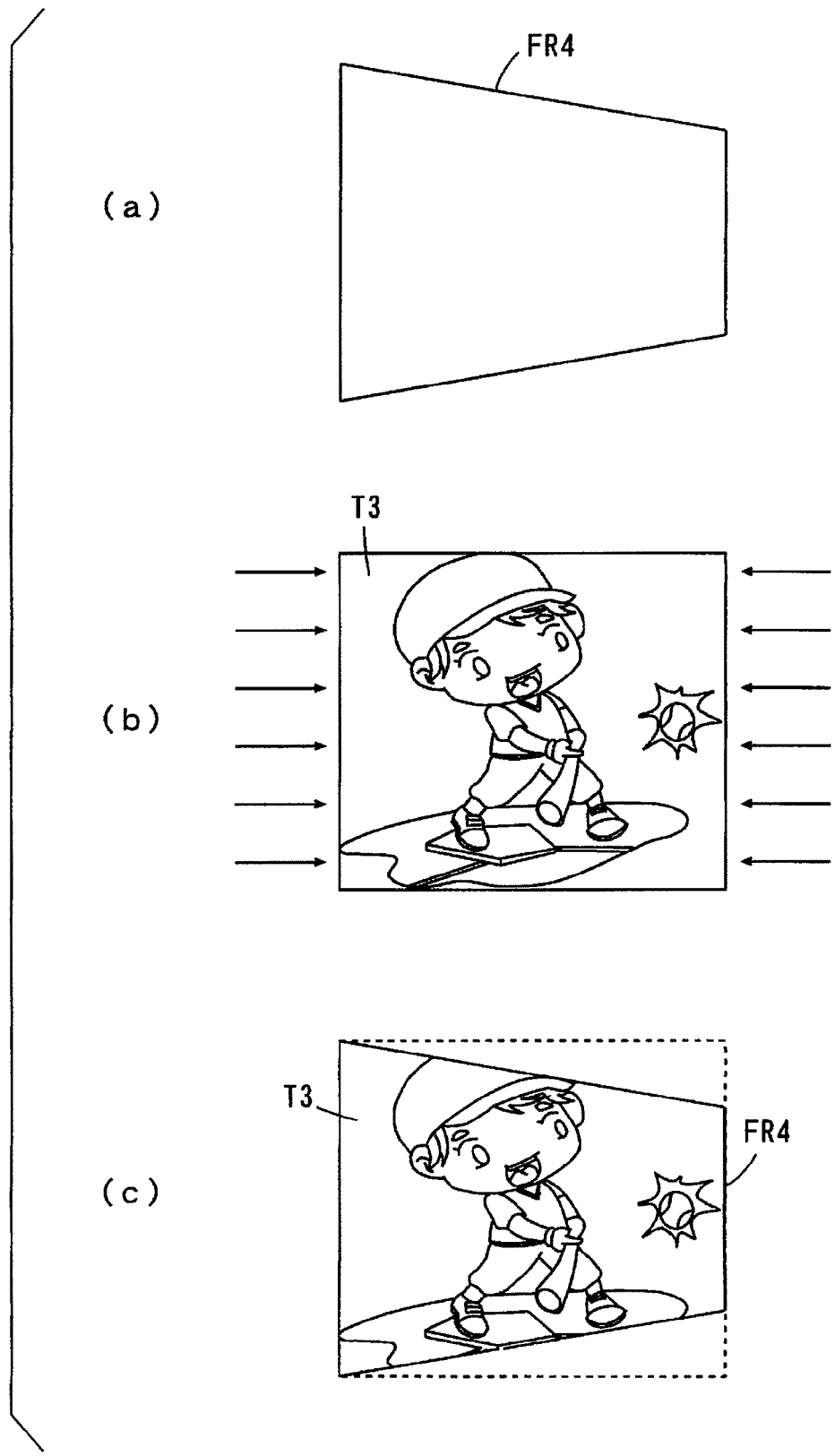
FIG. 15 is a schematic view illustrating another example of a display frame of a launcher image.

FIGS. 15 to 18 are schematic views illustrating other examples of the display frame of the launcher image. FIGS. 15 (a), 16 (a), 17 (a), and 18 (a) illustrate display frames, FIGS. 15 (b), 16 (b), 17 (b), and 18 (b) illustrate reduced television images, and FIGS. 15 (*c*), 16 (*c*), 17 (*c*), and 18 (*c*) illustrate states where the television image is displayed in the display frame.

In an example illustrated in FIG. 15 (*a*), a display frame FR4 has a laterally-facing trapezoidal shape opposite to the display frame FR2 illustrated in FIG. 3 (*c*). In this case, the upper side and the lower side of the display frame FR4 are also inclined to a horizontal direction, and the left side and the right side thereof also extend in a vertical direction. The vertical size of a television image T3 illustrated in FIG. 15 (*b*) is equal to the maximum length in the vertical direction of the display frame FR4 illustrated in FIG. 15 (*a*). The horizontal size of the television image T3 is equal to the maximum length in the horizontal direction of the display frame FR4. As illustrated in FIG. 15 (*c*), a portion, corresponding to an area in the display frame FR4, of the television image T3 is displayed in the display frame FR4.

In an example illustrated in FIG. 16 (*a*), a display frame FR5 has a trapezoidal shape. In this case, the upper side and the lower side of the display frame FR5 extend in the horizontal direction, and the left side and the right side are inclined to the vertical direction. The vertical size of a television image T4 illustrated in FIG. 16 (*b*) is equal to the maximum length in the vertical direction of the display frame FR5 illustrated in FIG. 16 (*a*), and the horizontal size of the television image T4 is equal to the maximum length in the horizontal direction of the display frame FR5. As illustrated in FIG. 16 (*c*), a portion, corresponding to an area in the display frame FR5, of the television image T4 is displayed in the display frame FR5.

In an example illustrated in FIG. 17 (*a*), a display frame FR6 has an inverted trapezoidal shape. In this case, the upper side and the lower side of the display frame FR6 extend in the horizontal direction, and the left side and the right side are inclined to the vertical direction. The vertical size of a television image T5 illustrated in FIG. 17 (*b*) is equal to the maximum length in the vertical direction of the display frame FR6 illustrated in FIG. 17 (*a*), and the horizontal size of the television image T5 is equal to the maximum length in the horizontal direction of the display frame FR6. As illustrated in FIG. 17 (*c*), a portion, corresponding to an area in the display frame FR6, of the television image T5 is displayed in the display frame FR6.

Figure 18:
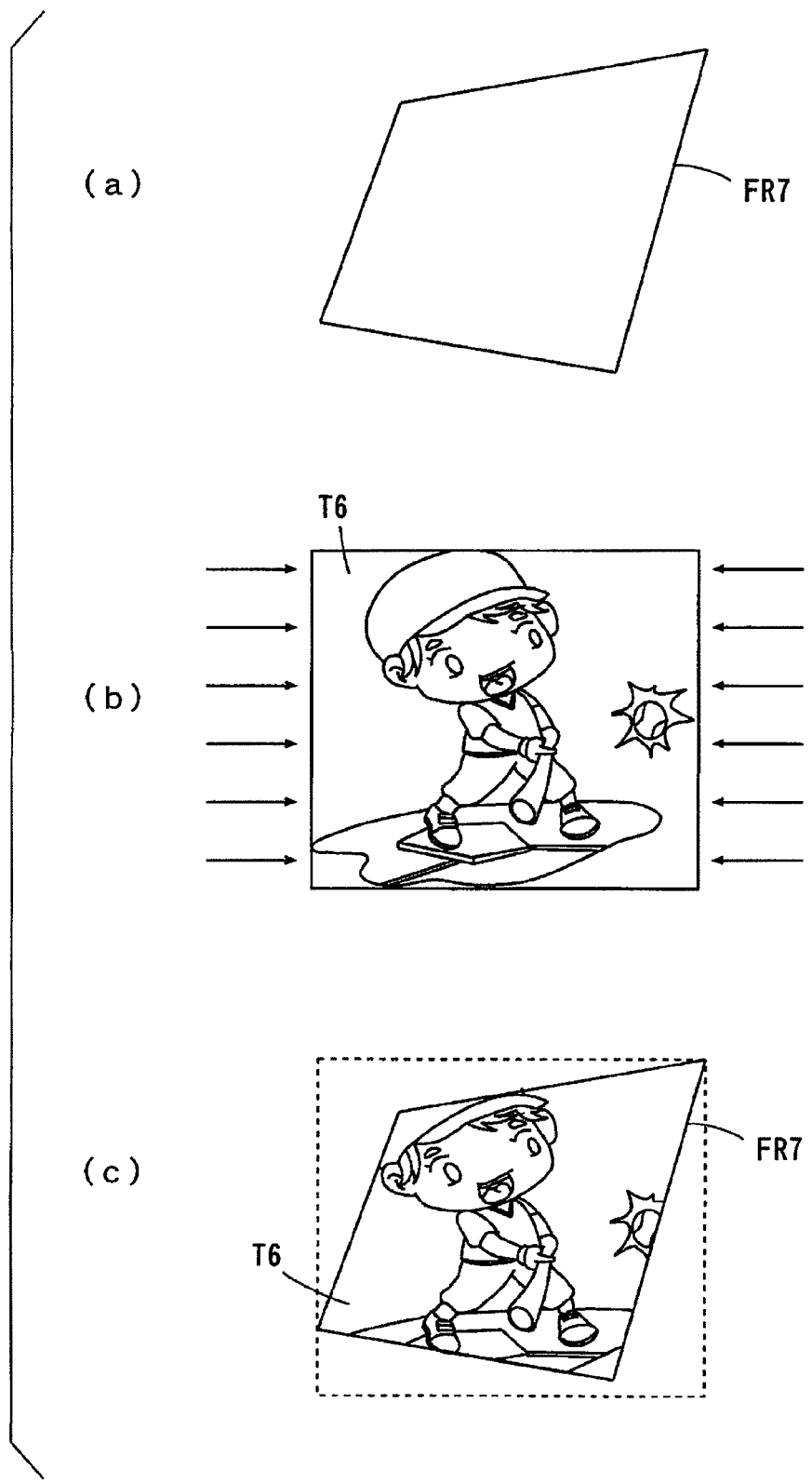
FIG. 18 is a schematic view illustrating another example of a display frame in a launcher image.

In an example illustrated in FIG. 18 (*a*), a display frame FR7 has a trapezoidal shape obliquely inclined. In this case, the upper side and the lower side of the display frame FR7 are inclined to the horizontal direction, and the left side and the right side are inclined to the vertical direction. The vertical size of a television image T6 illustrated in FIG. 18 (*b*) is equal to the maximum length in the vertical direction of the display frame FR7 illustrated in FIG. 18(*a*), and the horizontal size of the television image T6 is equal to the maximum length in the horizontal direction of the display frame FR7. As illustrated in FIG. 18 (*c*), a portion, corresponding to an area in the display frame FR7, of the television image T6 is displayed in the display frame FR7.

A shape of an intermediate frame in an intermediate launcher image is not limited to the shape of the intermediate frame FR1 illustrated in FIG. 2 (*b*). For example, it may be another perspective shape of the screen 110. For example, the intermediate frame of the intermediate launcher image may have a similar shape to those of the display frames illustrated in FIGS. 15 to 18.

Further, a shape of a display frame in a transient launcher image is not limited to the shape of the display frame FR3 illustrated in FIG. 6 (*b*). For example, it may be another perspective shape of the screen 110.

The shapes of the display frame and the intermediate frame may be not a perspective shape of the screen 110 but other shapes different from that of the screen 110. For example, the shapes of the display frame and the intermediate frame may be a polygon such as a triangle, a pentagon, or a hexagon. They may be a shape, formed of a curve, such as an ellipse.

(b) While in the above-mentioned embodiment, the intermediate display state includes one intermediate launcher image, the intermediate display state may include a plurality of intermediate launcher images. In this case, in the intermediate display state, at least one of the size and the shape of the launcher image may preferably be changed in a step-by-step manner. An operation button in the launcher image may preferably move in a step-by-step manner.

Similarly, the transient launcher display state may include a plurality of transient launcher images.

(c) While in the above-mentioned embodiment, the digital broadcast receiving apparatus 100 includes the monitor 13, the digital broadcast receiving apparatus 100 need not include the monitor 13. In this case, video data output from the synthesizer 10 is output to an external monitor.

(d) A casing of the digital broadcast receiving apparatus 100 may be provided with an operation portion that can be operated by a user in place of or in addition to the remote control light receiver 7 and the remote control 14.

(e) While in the above-mentioned embodiment, the controller 8 outputs television video data and application image data fed from the decoder 3 to the monitor 13 via the scaler 9 and the synthesizer 10 in the television display state and the application display state, the present invention is not limited to this. For example, the controller 8 may output the television video data and the application video data fed from the decoder 3 to the monitor 13 without via the scaler 9 and the synthesizer 10 in the television display state and the application display state.

(f) While in the above-mentioned embodiment, the application video data at the time of startup and the application video data at the time of the end are stored in the main memory 4 for each startup of the application and for each end of the application, timing at which the application video data at the time of startup and the application video data at the time of the end are stored in the main memory 4 is not limited to this.

If the application video data at the time of startup or the application video data at the time of the end is not stored in the main memory 4, for example, the application video data at the time of startup or the application video data at the time of the end may be stored in the main memory 4.

If it is detected that the application image at the time of startup or the application image at the time of the end is changed, the application video data at the time of startup or the application video data at the time of the end may be stored in the main memory 4.

Further, if it is detected that a skin (material) for the application image at the time of startup or the application image at the time of the end is changed, the application video data at the time of startup or the application video data at the time of the end may be stored in the main memory 4.

The application video data at the time of startup or the application video data at the time of the end may be stored in the main memory 4 periodically once per week, for example.

The application video data at the time of startup or the application video data at the time of the end may be stored in the main memory 4 with the application image at the time of startup or the application image at the time of the end displayed on the screen 110. Alternatively, the application video data at the time of startup or the application video data at the time of the end may be stored in the main memory 4 without the application image at the time of startup or the application image at the time of the end being displayed on the screen 110.

(5) Correspondences between Elements in the Claims and Parts in Embodiments

In the following, non-limiting examples of correspondences between various elements recited in the claims below and those described above with respect to various preferred embodiments of the present invention are explained.

In the above-mentioned embodiments, the tuner 1 is an example of a receiver, the separation circuit 2 and the decoder 3 are examples of a first image generator, the GUI drawer 11 and the frame buffer 12 are examples of a second image generator, the synthesizer 10 is an example of a synthesizer, the scaler 9 is an example of a size changer, the controller 8 is an example of a controller, and the monitor 13 is an example of a display device.

The application image is an example of a first image, the launcher image is an example of a second image, the television image is an example of a third image, the application video data is an example of first video data, the launcher video data is an example of second video data, the television video data is an example of third video data, the application display state is an example of a first display state, the launcher display state is an example of a second display state, and the GUI image is an example of a graphic image.

Further, the screen 110 is an example of a screen, the operation buttons B1, B2, B3, and B4 are examples of an operation portion, the operation buttons B1, B2, and B3 are examples of a startup instructor, the display frames FR2, FR3, FR4, FR5, FR6, and FR7 are examples of a display frame, and the intermediate frame FR1 is an example of an intermediate frame.

As each of various elements recited in the claims, various other elements having configurations or functions described in the claims can also be used.

[Industrial Applicability]

The present invention is applicable to a digital television, a digital broadcasting set-top box (STB), a digital versatile disk (DVD) recording/reproducing apparatus, a hard disk drive (HDD) recording/reproducing apparatus, a mobile phone capable of receiving digital broadcasting, and so on which are used to display an image for digital broadcasting.

The invention claimed is:

1. A digital broadcast receiving apparatus that receives digital broadcasting to display an image on a screen of a display device, comprising:
a first image generator that generates first video data for displaying an image for an application program as a first image on said screen;
a second image generator that generates second video data for displaying a graphic image as a second image on said screen;
a storage that stores the first video data generated by said first image generator at predetermined timing;
a synthesizer that synthesizes the first video data and the second video data to display the first and second images on said screen;
a controller that selectively switches a display state on said screen between a first display state where the first image is displayed and a second display state where the first and second images are displayed; and
a size changer that processes the first video data generated by said first image generator to change at least one of vertical and horizontal dimensions of the first image,
wherein the second image in said second display state includes a display frame for displaying said first image, the display frame having a shape different from a shape of said screen and having a non-rectangular shape,
said controller controls said first image generator so that the first image based on the first video data generated by said first image generator is displayed on said screen in said first display state, and controls said second image generator, said storage, and said synthesizer so that the second image based on the second video data generated by said second image generator is displayed on said screen while the first image based on the first video data stored in said storage is displayed in said display frame in said second display state, and
said controller controls said second image generator so that the second image is displayed on said screen in said second display state, controls said size changer so that the vertical and horizontal dimensions of the first image are respectively changed to the maximum lengths in a vertical direction and a horizontal direction of said display frame, and a portion of the changed first image corresponding to an area outside the display frame is deleted, and controls said synthesizer so that a portion corresponding to an area, in said display frame, of the first image changed by the size changer is displayed in said display frame.

2. The digital broadcast receiving apparatus according to claim 1, wherein
said storage stores the first video data corresponding to the image at a time of startup of the application program, and
said controller causes the display state on said screen to change from said second display state to said first display state when an instruction to start the application program is issued, controls said second image generator, said storage, and said synthesizer so that the image at the time of startup of the application program is displayed in said display frame based on the first video data stored in said storage in said second display state, and controls said first image generator so that the image for the application program during startup is displayed on said screen based on the first video data generated by said first image generator in said first display state.

3. The digital broadcast receiving apparatus according to claim 1, wherein
said storage stores the first video data corresponding to the image for the application program at an end of said first display state, and
said controller causes the display state on said screen to change from said first display state to said second display state when an instruction to switch from said first display state to said second display state is issued, controls said first image generator so that the image for the application program during startup is displayed on said screen based on the first video data generated by said first image generator in said first display state, and controls said second image generator, said storage, and said synthesizer so that the image for the application program at the end of said first display state is displayed in said display frame based on the first video data stored in said storage in said second display state.

4. The digital broadcast receiving apparatus according to claim 1, wherein
said storage stores the first video data corresponding to the image at a time of startup and at an end of the application program, and said controller causes the display state on said screen to change from said first display state to said second display state when an instruction to end said application program is issued, controls said first image generator so that the image for the application program during startup is displayed on said screen based on the first video data generated by said first image generator in said first display state, and controls said second image generator, said storage, and said synthesizer so that the image at the time of startup of said application program is displayed in said display frame based on the first video data stored in said storage after the image at the end of the application program is displayed in said display frame based on the first video data stored in said storage in said second display state.

5. The digital broadcast receiving apparatus according to claim 1, wherein
said controller switches the display state on said screen between said first display state and said second display state via an intermediate display state where the first and second images are displayed,
the second image in said intermediate display state includes an intermediate frame having a size larger than that of said display frame, and
said controller controls said second image generator, said storage, and said synthesizer so that the second image based on the second video data generated by said second image generator is displayed on said screen while the first image based on the first video data stored in said storage is displayed in said intermediate frame in said intermediate display state.

6. The digital broadcast receiving apparatus according to claim 5, wherein the second image in said second display state further includes an operator that can be operated by the user.

7. The digital broadcast receiving apparatus according to claim 6, wherein said operator includes a startup instructor for issuing an instruction to start the application program.

8. The digital broadcasting receiving apparatus according to claim 1, wherein the shape different from the shape of said screen is a perspective shape of said screen.

9. The digital broadcast receiving apparatus according to claim 1, further comprising: a receiver that receives digital broadcasting, wherein
said first image generator further generates third video data for displaying the image for the digital broadcasting received by said receiver as a third image on said screen,
said synthesizer synthesizes the third video data and the second video data to display the third and second images on said screen, and
said controller controls said second image generator so that the second image is displayed on said screen, controls said size changer so that vertical and horizontal dimensions of the third image are respectively changed to the maximum lengths in the vertical direction and the horizontal direction of said display frame, and controls said synthesizer so that a portion corresponding to an area, in said display frame, of the third image changed by said size changer is displayed in said display frame.

10. A video display method for displaying an image on a screen of a display device by a digital broadcast receiving apparatus, comprising:
generating first video data for displaying an image for an application program as a first image on the screen;
generating second video data for displaying a graphic image including a display frame for displaying a first image as a second image on the screen, the display frame having a shape different from a shape of the screen and having a non-rectangular shape;
storing the first video data generated at predetermined timing in a storage;
synthesizing the first video data and the second video data to display the first and second images on the screen;
selectively switching a display state on the screen between a first display state where the first image is displayed and a second display state where the first and second images are displayed;
controlling the generation of the first video data so that the first image based on the generated first video data is displayed on the screen in the first display state; and
controlling the generation of the second video data, the storage of the first video data, and the synthesis of the first and second video data so that the second image based on the generated second video data is displayed on the screen while the first image based on the first video data stored in the storage is displayed in the display frame in the second display state;
processing the generated first video data to change a size of the first image by changing at least one of vertical and horizontal dimensions of the first image, and
controlling the generation of the second video data, the change in the size of the first image, and the synthesis of the first and the second video data, so that the vertical and horizontal dimensions of the first image are respectively changed to the maximum lengths in a vertical direction and a horizontal direction of the display frame, a portion of the changed first image corresponding to an area outside the display frame is deleted, and a portion corresponding to an area, in the display frame, of the changed first image is displayed in the display frame.

\* \* \* \* \*